(12) United States Patent
Kim et al.

(10) Patent No.: US 10,233,129 B2
(45) Date of Patent: Mar. 19, 2019

(54) METHODS FOR APPLICATION OF BIOCHAR

(71) Applicant: Cool Planet Energy Systems, Inc., Greenwood Village, CO (US)

(72) Inventors: Han Suk Kim, Thousand Oaks, CA (US); Kevin Daniel Dolinar, Ventura, CA (US); Mark L. Jarand, Newbury Park, CA (US); Vern Traxler, Simi Valley, CA (US); Timothy Alan Thompson, Ventura, CA (US); Rajashekharam Malyala, Camarillo, CA (US)

(73) Assignee: Cool Planet Energy Systems, Inc., Greenwood Village, CO (US)

( * ) Notice: Subject to any disclaimer, the term of this patent is extended or adjusted under 35 U.S.C. 154(b) by 0 days.

(21) Appl. No.: 15/263,227

(22) Filed: Sep. 12, 2016

(65) Prior Publication Data
US 2017/0096375 A1    Apr. 6, 2017

Related U.S. Application Data

(63) Continuation-in-part of application No. 15/184,325, filed on Jun. 16, 2016, and a continuation-in-part of
(Continued)

(51) Int. Cl.
*C09K 17/04* (2006.01)
*C05G 3/04* (2006.01)
(Continued)

(52) U.S. Cl.
CPC .............. *C05D 9/00* (2013.01); *A01C 21/005* (2013.01); *A01G 17/02* (2013.01); *A01G 22/00* (2018.02);
(Continued)

(58) Field of Classification Search
CPC .................................. C05F 11/00; C01B 31/02
See application file for complete search history.

(56) References Cited

U.S. PATENT DOCUMENTS

| 1,369,428 A | 2/1921 | Hawley |
| 3,841,974 A | 10/1974 | Osborne |
| (Continued) | | |

FOREIGN PATENT DOCUMENTS

| CN | 1997590 A | 7/2007 |
| CN | 103053244 A | 4/2013 |
| (Continued) | | |

OTHER PUBLICATIONS

Beesley, et al.; A review of biochars' potential role in the remediation, revegetation and restoration of contaminated soils; Environmental Pollution 159 (2011) 3269-3232.
(Continued)

*Primary Examiner* — Wayne A Langel
(74) *Attorney, Agent, or Firm* — Avyno Law P.C.

(57) ABSTRACT

A method is provided for applying porous carbonaceous particles to soil for purpose of cultivating plants having roots, where at least 95% of the porous carbonaceous particles have a particle size less than or equal to 10 mm. The method incorporates the porous carbonaceous particles into the soil surrounding the plant roots at a depth of between 0-24 inches from the soil surface, where the porous carbonaceous particles are positioned in the area surrounding the roots of the plants at a ratio of between 1:999 to 1:1 porous carbonaceous particles to soil.

49 Claims, 21 Drawing Sheets

Related U.S. Application Data application No. 15/184,763, filed on Jun. 16, 2016, application No. 15/263,227, filed on Sep. 12, 2016, which is a continuation-in-part of application No. 15/156,256, filed on May 16, 2016, now Pat. No. 9,809,502, and a continuation-in-part of application No. 14/873,053, filed on Oct. 1, 2015, application No. 15/263,227, filed on Sep. 12, 2016, which is a continuation-in-part of application No. 14/385,986, filed as application No. PCT/US2012/039862 on May 29, 2012, now Pat. No. 9,493,380, which is a continuation-in-part of application No. 13/154,213, filed on Jun. 6, 2011, now Pat. No. 8,317,891.

(60) Provisional application No. 62/186,876, filed on Jun. 30, 2015, provisional application No. 62/180,525, filed on Jun. 16, 2015, provisional application No. 62/058,445, filed on Oct. 1, 2014, provisional application No. 62/058,472, filed on Oct. 1, 2014.

(51) Int. Cl.

| | | |
|---|---|---|
| *C05D 9/00* | (2006.01) | |
| *C05G 3/00* | (2006.01) | |
| *C09K 17/02* | (2006.01) | |
| *A01C 21/00* | (2006.01) | |
| *A01G 17/02* | (2006.01) | |
| *C05F 11/00* | (2006.01) | |
| *C05F 11/02* | (2006.01) | |
| *C05F 11/08* | (2006.01) | |
| *C10B 53/02* | (2006.01) | |
| *C10B 57/02* | (2006.01) | |
| *A01G 22/00* | (2018.01) | |
| *C05D 9/02* | (2006.01) | |
| *C09K 17/40* | (2006.01) | |

(52) U.S. Cl.
CPC .............. *C05F 11/00* (2013.01); *C05F 11/02* (2013.01); *C05F 11/08* (2013.01); *C05G 3/00* (2013.01); *C05G 3/04* (2013.01); *C09K 17/02* (2013.01); *C09K 17/04* (2013.01); *C10B 53/02* (2013.01); *C10B 57/02* (2013.01); *C05D 9/02* (2013.01); *C09K 17/40* (2013.01); *Y02E 50/14* (2013.01); *Y10S 71/903* (2013.01)

(56) References Cited

U.S. PATENT DOCUMENTS

| | | | |
|---|---|---|---|
| 4,153,514 A | 5/1979 | Garrett et al. | |
| 4,268,275 A | 5/1981 | Chittick | |
| 4,383,391 A | 5/1983 | Thomas et al. | |
| 4,421,524 A | 12/1983 | Chittick | |
| 4,487,958 A | 12/1984 | Ream et al. | |
| 4,495,165 A | 1/1985 | Gurza | |
| 4,497,637 A | 2/1985 | Purdy et al. | |
| 4,501,644 A | 2/1985 | Thomas | |
| 4,530,702 A | 7/1985 | Fetters et al. | |
| 4,553,351 A * | 11/1985 | Guay | C05F 3/00 111/118 |
| 4,618,735 A | 10/1986 | Bridle et al. | |
| 4,861,351 A | 8/1989 | Nicholas et al. | |
| 4,992,480 A | 2/1991 | Mahajan et al. | |
| 5,015,423 A | 5/1991 | Eguchi et al. | |
| 5,032,618 A | 7/1991 | Marchionna et al. | |
| 5,087,786 A | 2/1992 | Nubel et al. | |
| 5,204,102 A | 4/1993 | Coles et al. | |
| 5,221,290 A | 6/1993 | Dell | |
| 5,368,626 A * | 11/1994 | Schnuda | A01G 9/1086 47/9 |
| 5,462,908 A | 10/1995 | Liang et al. | |
| 5,504,259 A | 4/1996 | Diebold et al. | |
| 5,508,060 A | 4/1996 | Perman et al. | |
| 5,755,058 A * | 5/1998 | Guyot | A01B 79/02 111/200 |
| 5,756,194 A | 5/1998 | Shogren et al. | |
| 5,820,640 A | 10/1998 | Ikura et al. | |
| 5,857,807 A | 1/1999 | Longo, Sr. | |
| 5,863,467 A | 1/1999 | Mariner et al. | |
| 6,133,328 A | 10/2000 | Lightner | |
| 6,227,473 B1 | 5/2001 | Arnold | |
| 6,228,806 B1 | 5/2001 | Mehta | |
| 6,339,031 B1 | 1/2002 | Tan | |
| 6,548,026 B1 | 4/2003 | Dales et al. | |
| 6,747,067 B2 | 6/2004 | Melnichuk et al. | |
| 6,811,703 B2 | 11/2004 | Elliott | |
| 6,841,085 B2 | 1/2005 | Werpy et al. | |
| 6,923,838 B2 | 8/2005 | Maubert et al. | |
| 6,994,827 B2 | 2/2006 | Safir et al. | |
| 7,033,972 B2 | 4/2006 | Shikada et al. | |
| 7,226,566 B2 | 6/2007 | Beierle | |
| 7,282,189 B2 | 10/2007 | Zauderer | |
| 7,458,999 B2 | 12/2008 | Schenck | |
| 7,846,979 B2 | 12/2010 | Rojey et al. | |
| 7,888,540 B2 | 2/2011 | Deluga et al. | |
| 7,947,155 B1 | 5/2011 | Green et al. | |
| 8,173,044 B1 | 5/2012 | Cheiky et al. | |
| 8,197,573 B2 | 6/2012 | Scharf | |
| 8,236,085 B1 | 8/2012 | Cheiky et al. | |
| 8,317,891 B1 * | 11/2012 | Cheiky | C05F 11/02 423/445 R |
| 8,317,892 B1 | 11/2012 | Cheiky et al. | |
| 8,318,997 B2 | 11/2012 | McAlister | |
| 8,361,186 B1 | 1/2013 | Shearer et al. | |
| 8,430,937 B2 | 4/2013 | Cheiky et al. | |
| 8,431,757 B2 | 4/2013 | Cheiky et al. | |
| 8,568,493 B2 | 10/2013 | Cheiky et al. | |
| 8,747,797 B2 | 6/2014 | Shearer et al. | |
| 9,260,666 B2 | 2/2016 | Aelion et al. | |
| 9,478,324 B1 | 10/2016 | Favetta et al. | |
| 9,493,379 B2 | 11/2016 | Cheiky et al. | |
| 9,873,639 B1 * | 1/2018 | Doccola | C05G 3/0047 |
| 2002/0012725 A1 | 1/2002 | Carlson | |
| 2003/0119552 A1 | 6/2003 | Laumen et al. | |
| 2004/0111968 A1 | 6/2004 | Day et al. | |
| 2004/0128909 A1 | 7/2004 | Smiley | |
| 2006/0225345 A1 | 10/2006 | Westrate | |
| 2007/0123420 A1 | 5/2007 | Hayashi et al. | |
| 2008/0006519 A1 | 1/2008 | Badger | |
| 2008/0016769 A1 | 1/2008 | Pearson | |
| 2008/0093209 A1 | 4/2008 | Noto | |
| 2008/0216391 A1 | 9/2008 | Cortright et al. | |
| 2008/0223269 A1 | 9/2008 | Paoluccio | |
| 2008/0300435 A1 | 12/2008 | Cortright et al. | |
| 2008/0317657 A1 | 12/2008 | Hall et al. | |
| 2008/0317907 A1 | 12/2008 | Thomas et al. | |
| 2009/0007484 A1 | 1/2009 | Smith | |
| 2009/0081292 A1 | 3/2009 | Otomo et al. | |
| 2009/0126433 A1 | 5/2009 | Piskorz et al. | |
| 2009/0139139 A1 | 6/2009 | Tilman et al. | |
| 2009/0151251 A1 | 6/2009 | Manzer et al. | |
| 2009/0183430 A1 | 7/2009 | Schubert et al. | |
| 2009/0217575 A1 | 9/2009 | Raman et al. | |
| 2009/0217584 A1 | 9/2009 | Raman et al. | |
| 2009/0253947 A1 | 10/2009 | Brandvold et al. | |
| 2009/0308787 A1 | 12/2009 | O'Connor et al. | |
| 2010/0040510 A1 | 2/2010 | Randhava et al. | |
| 2010/0162780 A1 * | 7/2010 | Scharf | C05B 7/00 71/36 |
| 2010/0180805 A1 | 7/2010 | Cheiky | |
| 2010/0218417 A1 | 9/2010 | Bauldreay et al. | |
| 2010/0223839 A1 | 9/2010 | Garcia-Perez et al. | |
| 2010/0236309 A1 | 9/2010 | Celia | |
| 2010/0236987 A1 | 9/2010 | Kreis | |
| 2010/0257775 A1 | 10/2010 | Cheiky | |
| 2010/0270505 A1 | 10/2010 | Gallaspy et al. | |
| 2010/0300866 A1 | 12/2010 | van Aardt et al. | |
| 2010/0310447 A1 | 12/2010 | Yaniv et al. | |
| 2010/0311157 A1 | 12/2010 | Van Alstyne et al. | |
| 2011/0003693 A1 | 1/2011 | Spittle | |

(56) References Cited

U.S. PATENT DOCUMENTS

| | | | |
|---|---|---|---|
| 2011/0023566 | A1* | 2/2011 | Lodwig .................. C05F 5/006 71/14 |
| 2011/0081336 | A1 | 4/2011 | Medoff |
| 2011/0092726 | A1 | 4/2011 | Clarke |
| 2011/0100359 | A1 | 5/2011 | North |
| 2011/0172092 | A1 | 7/2011 | Lee et al. |
| 2011/0177466 | A1 | 7/2011 | Cheiky |
| 2011/0209386 | A1 | 9/2011 | Cheiky et al. |
| 2011/0212004 | A1 | 9/2011 | Cheiky et al. |
| 2011/0258912 | A1 | 10/2011 | O'connor et al. |
| 2012/0103040 | A1 | 5/2012 | Wolf et al. |
| 2012/0125064 | A1 | 5/2012 | Joseph et al. |
| 2012/0208254 | A1 | 8/2012 | Smith et al. |
| 2012/0220454 | A1 | 8/2012 | Chen et al. |
| 2012/0237994 | A1 | 9/2012 | Das et al. |
| 2012/0283493 | A1 | 11/2012 | Olson et al. |
| 2012/0286209 | A1 | 11/2012 | Cheiky et al. |
| 2012/0304718 | A1 | 12/2012 | Cheiky et al. |
| 2012/0304719 | A1 | 12/2012 | Cheiky et al. |
| 2013/0025188 | A1 | 1/2013 | Cheiky et al. |
| 2013/0025190 | A1 | 1/2013 | Cheiky et al. |
| 2013/0123103 | A1 | 5/2013 | Anderson et al. |
| 2013/0213101 | A1 | 8/2013 | Shearer et al. |
| 2014/0016709 | A1 | 1/2014 | Ko et al. |
| 2014/0024528 | A1 | 1/2014 | Smith et al. |
| 2014/0037536 | A1 | 2/2014 | Reimerink-Schats et al. |
| 2014/0161709 | A1 | 6/2014 | Karthikeyan |
| 2014/0177136 | A1 | 6/2014 | Kirn et al. |
| 2014/0345341 | A1 | 11/2014 | Fiato et al. |
| 2014/0345343 | A1 | 11/2014 | Wilson et al. |
| 2014/0349847 | A1 | 11/2014 | Schrader |
| 2014/0352378 | A1 | 12/2014 | Shearer et al. |
| 2015/0101372 | A1 | 4/2015 | Cheiky et al. |
| 2015/0128672 | A1 | 5/2015 | Wearer et al. |
| 2015/0157661 | A1 | 6/2015 | Eddy et al. |
| 2015/0361369 | A1 | 12/2015 | Tait et al. |
| 2016/0023959 | A1 | 1/2016 | Bontchev et al. |
| 2016/0102024 | A1 | 4/2016 | Schrader et al. |
| 2016/0362607 | A1 | 12/2016 | Weaver et al. |
| 2016/0368831 | A1 | 12/2016 | Bontchev et al. |

FOREIGN PATENT DOCUMENTS

| | | |
|---|---|---|
| EP | 01140811 A2 | 5/1985 |
| GB | 2479469 A | 10/2011 |
| KR | 100819505 B1 | 4/2008 |
| WO | 8204223 A1 | 12/1982 |
| WO | 2004037747 A2 | 5/2004 |
| WO | 2009004652 A1 | 1/2009 |
| WO | 2010084230 A1 | 7/2010 |
| WO | 2010129988 A1 | 11/2010 |
| WO | 2011006717 A1 | 1/2011 |
| WO | 2011014916 A1 | 2/2011 |
| WO | 2011097183 A2 | 8/2011 |
| WO | 2011143380 A2 | 11/2011 |
| WO | 2011143718 A1 | 11/2011 |
| WO | WO 2011/159154 A1 * | 12/2011 |
| WO | 2014091279 A1 | 6/2014 |
| WO | 2014146205 A1 | 9/2014 |
| WO | 2016054431 A1 | 4/2016 |
| WO | 2016187161 A1 | 11/2016 |

OTHER PUBLICATIONS

Berek, et al.; Improving Soil Productivity with Biochars; ICGAI, Yogyakarta, Indonesia; Nov. 11-14, 2013; 23 pp; Abstract.

Kolton, et al.; Impact of Biochar Application to Soil on the Root-Associated Bacterial Community Structure of Fully Developed Greenhouse Pepper Plants; Appl. Env. Micro, Jul. 2011, p. 4924-4930.

Sorrenti; (Doctoral Thesis): Biochar in prerrennial crops: Nutritional, Agronomical and Environmental implications; University of Bologna; Mar. 1, 2015; Abstract; 121 pp.

Ahmad, et al., "Biochar as a Sorbent for Contaminant Management in Soil and Water: A Review," Chemosphere, vol. 99, pp. 19-33 (Nov. 27, 2013).

Biliaderis, et al., "Functional Food Carbohydrates," CRC Press 2006, Ch. 16, pp. 517-518.

Bucheli, et al., "Polycyclic Aromatic Hydrocarbons and Polychlorinated Aromatic Compounds in Biochar," Biochar for Environmental Management, Ch. 21, pp. 595-622 (Jan. 2015).

Buerschaper, R., "Thermal & Electrical Conductivity of Graphite & Carbon at Low Temperatures," Jour. of App. Physics, pp. 452-454 (1944).

Cheng, et al., "Stability of Black Carbon in Soils Across a Climatic Gradient," Jour. of Geophysical Research Biogeosciences, vol. 113, G02027, pp. 1-10 (2008).

Chew, T.L. and Bhatia, S., "Catalytic Processes Towards the Production of Biofuels in a Palm Oil and Oil Palm Biomass-based Biorefinery," Bioresource Tech., vol. 99, pp. 7911-8922 (2008).

Demirbas, A., "Effects of Temperature & Particle Size on Bio-Char Yield from Pyrolysis of Agricultural Residues," J. Anal. Pyrolysis, Pyrolysis, vol. 72, pp. 243-248 (2004).

Downie: Biochar Production and Use: Environmental Risks and Rewards: PhD Thesis: The University of New South Wales; Sydney, Australia, p. 1-16, p. 155-168 (2011).

Elliott, D.C. and Neuenschwander, G.G., "Liquid Fuels by Low-Severity Hydrotreating of Biocrude," Dev. in Thermochemical Biomass Conversion, vol. 1, pp. 611-621 (1996).

Extended European Search Report issued by the European Patent Office for European Patent Application No. 12797129.9 dated Mar. 6, 2015 (7 pgs.).

Extended European Search Report issued by the European Patent Office for European Patent Application No. 12817137.8 dated Jul. 13, 2015 (8 pgs.).

Faludi, J., "World Changing Change Your Thinking a Carbon-Negative Fuel," Oct. 16, 2007; www.worldchanging.com (9 pgs.).

Gehrer, R. and Hayek, K., "A Fully Programmable System for the Study of Catalytic Gas Reactions," J. Physc. E: Sci. Instrum., vol. 18, pp. 836-838 (1985).

Gray, et al., "Water Update in Biochars: The Roles of Porosity and Hydrophobicity; Biomass and Bioenergy," vol. 6, No. 1, pp. 196-205 (Jan. 23, 2014).

Greenfacts, "Facts on Health and the Environment," Dioxins, Apr. 13, 2017, 3 pp.; retrieved from https://www.greenfacts.org/en/d on Aug. 15, 2004.

Hadjittofi, et al., "Activated Biochar Derived from Cactus Fibres—Preparation, Characterization and Application on CU(II) Removal from Aqueous Solutions," Bioresource Technology, vol. 159, pp. 460-464 (May 2014).

Hua, et al., "Impacts Upon Soil Quality and Plant Growth of Bamboo Charcoal Addition to Composted Sludge," Environmental Technology, vol. 33, No. 1, pp. 61-68 (Jan. 18, 2012).

Innovation Fluides Supercritiques, Explore, Use, Make the Most of Supercritical Fluids, Nov. 27, 2015. Online, retrieved from the Internet on Mar. 6, 2017; <http://web/archive.org/web/20151127045828/http://www.supercriticalfluid.org/supercritical-fluids.146.0>html; 2 pp.

Jindo, et al., "Biochar Influences the Microbial Community Structure During Manure Composting with Agricultural Wastes," Science of the Total Environment, vol. 416, pp. 476-481 (Feb. 2012).

Karmakar, et al., "Plant Defence Activators inducing Systematic Resistance in Zingiber Officinale Rosc. Against Pythium Aphanidermatum (Edson) Fitz.," Indian Journal of Biotechnology, vol. 2, pp. 591-595 (2003).

Kim, et al., "Characteristics of Crosslinked Potato Starch & Starch-Filled Linear Low-Density Polyethylene Films," Carbohydrate Polymers, vol. 50, pp. 331-337 (2002).

Laird, D., "The Charcoal Vision: A Win Win Scenario," Aaron, J., vol. 100, No. 1, pp. 178-181 (2008).

Lashari, et al., "Effect of Amendment of Biochar-manure Compost in Conjunction with Pyroligneous Solution on Soil Quality and Wheat Yield of a salt-stressed Cropland from Central China Great Plain," Field Crops Research, vol. 144, pp. 113-118 (Mar. 20, 2013).

(56) References Cited

OTHER PUBLICATIONS

Lehmann, J., "Nutrient Avail. & Leaching in an Archaeological Anthrosol & Ferraisol of the Central Amazon Basin: Fertilizer, Manure and Charcoal Amendments," Plant Soil, vol. 249, pp. 343-357 (2003).
Lima, et al., "Physiochemical and Adsorption Properties of Fast-Pyrolysis Bio-Chars and their Steam Activated Counterparts," J.Chem. Tech. Biotechnical, vol. 85, pp. 1515-1521 (2010).
Liu, et al., "An Experimental Study of Rheological Properties and Stability Characteristics of Biochar-Glycerol-Water Slurry Fuels," Fuel Processing Technology, vol. 153, Issue 1, pp. 37-42 (Aug. 5, 2016).
Mathews, J.A., "Carbon-negative Biofuels", Energy Policy, vol. 36, pp. 940-945 (2008).
McHenry, Mark P., "Agricultural Bio-char Production, Renewable Energy Generation and Farm Carbon Sequestration in Western Australia: Certainty, Uncertainty and Risk," Agriculture, Ecosystems and Environments, vol. 129, pp. 1-7 (2009).
Mohan, et al., "Pyrolysis of Wood/Biomass for Bio-Oil: A Critical Review," Energy & Fuels, vol. 20, pp. 848-889 (2006).
Norman, et al.; "Best Management Practices for Reclaiming Surface Mines in Washington and Oregon," Open-File Report 0-92-2, revised ed. Dec. 1997: www.oregongeology.org Feb. 9, 2010 (128 pgs.).
Oh, et al., "Ulitization of Biochar Impregnated with Anaerobically Digested Slurry as Slow-Release Fertilizer," Journal of Plant Nutrition and Soil Science, vol. 177, Issue 1, pp. 97-103 (Feb. 2014).
Omata, et al., "Optimization of Cu Oxide Catalyst for Methanol Synthesis under High C02 Partial Pressure Using Combinatorial Tools," App. Catalyst A: General, vol. 262, pp. 207-214 (2004).
Preston, C.M. and Schmidt, M.W., "Black (Pyrogenic) Carbon; a Synthesis of Current Knowledge & Uncertainties w/ Special Consideration of Boreal Regions," Biogeosciences, vol. 3, pp. 397-420 (2006).
Rosenberg, et al., "More on Commercial Carbon Resistors as Low Pressure Gauges," Intl. Jour of Impat. Eng., vol. 34, pp. 732-742 (2007).
Schmidt, et al., "Biochar and Biochar-compost as Soil Amendments to a Vineyard Soil: Influence on Plant Growth, Nutrient Update, Plant Health and Grape Equality," Agriculture, Ecosystems and Environment, vol. 191, Issue 15, pp. 117-123 (Jun. 2014).
Sharma, R.K. and Bakhshi, N.N., "Catalytic Upgrading of Pyrolysis Oil," Energy & Fuels, vol. 7, pp. 306-314 (1993).
Shivaram, et al., "Flow and Yield Behavior of Ultrafine Mallee Biochar Slurry Fuels: The Effect of Particle Size Distributon and Additives," 10th Japan/China Symposium on Coal and C1 Chemistry, vol. 104, pp. 326-332 (Feb. 2013).
Takeishi, K., "Dirnethy Ether & Catalyst Development for Production of Syngas," Biofuels, vol. 1(1), pp. 217-226 (2010).
Tryon, E.H.; "Effect of Charcoal on Certain Physical, Chemical, & Biological Properties of Forest Soils," Ecological Monographs, vol. 18, No. 1, pp. 81-115 (Jan. 1948).
Xusheng, et al., "Implications of Production and Agricultural Utilization of Biochar and its International Dynamic," Transactions of the CSAE, vol. 27, No. 2, 7 pgs. (2011) with English Abstract.
Wikipedia; Bacillus Thuringiensis; Dec. 27, 2015; online, retrieved from the Internet on Mar. 6, 2017; <https://en/wikipedia.org/w/index.php?title=bacillus+thuringlensis&oldid=696970111>; 6 pp.
Supplemental European Search Report dated Aug. 17, 2017 for EP 14875314.8.

* cited by examiner

METHODS FOR APPLICATION OF BIOCHAR

RELATED APPLICATIONS

This application claims priority to U.S. Provisional Patent Application Ser. No. 62/216,638 filed on Sep. 10, 2015, titled METHODS FOR APPLICATION OF BIOCHAR; U.S. Provisional Patent Application Ser. No. 62/290,026 filed on Feb. 2, 2016, titled BIOCHAR AGGREGATE PARTICLES; U.S. Provisional Patent Application Ser. No. 62/219,501 filed Sep. 16, 2015 titled BIOCHAR SUSPENDED SOLUTION; is a continuation-in-part of U.S. patent application Ser. No. 15/184,325 filed Jun. 16, 2016, titled BIOCHAR COATED SEEDS which claims priority to U.S. Provisional Patent Application Ser. No. 62/186,876 filed Jun. 30, 2015, titled BIOCHAR COATED SEEDS; is a continuation-in-part of U.S. patent application Ser. No. 15/184,763 filed Jun. 16, 2016, titled METHOD FOR APPLICATION OF BIOCHAR IN TURF GRASS LANDSCAPING ENVIRONMENTS which claims priority to U.S. Provisional Patent Application Ser. No. 62/180,525 filed Jun. 16, 2015 titled METHOD FOR APPLICATION OF BIOCHAR IN TURF GRASS ENVIRONMENT; is a continuation-in-part application of U.S. patent application Ser. No. 15/156,256 filed May 16, 2016 titled ENHANCED BIOCHAR, which application claims priority to U.S. Provisional Patent Application No. 62/162,219, filed on May 15, 2015, titled ENHANCED BIOCHAR; is a continuation-in-part of U.S. patent application Ser. No. 14/873,053 filed on Oct. 1, 2015, titled BIOCHARS AND BIOCHAR TREATMENT PROCESSES which claims priority to U.S. Provisional Patent Application No. 62/058,445, filed on Oct. 1, 2014, titled METHODS, MATERIALS AND APPLICATIONS FOR CONTROLLED POROSITY AND RELEASE STRUCTURES AND APPLICATIONS and U.S. Provisional Patent Application No. 62/058,472, filed on Oct. 1, 2014, titled HIGH ADDITIVE RETENTION BIOCHARS, METHODS AND APPLICATIONS; is a continuation-in-part of U.S. patent application Ser. No. 14/385,986 filed on May 29, 2012, titled METHOD FOR ENHANCING SOIL GROWTH USING BIOCHAR which is a 371 of PCT/US12/39862 filed on May 29, 2012, which is a continuation-in-part of U.S. patent application Ser. No. 13/154,213 filed on Jun. 6, 2011 (now U.S. Pat. No. 8,317,891); and is a continuation-in-part of U.S. patent application Ser. No. 14/036,480, filed on Sep. 25, 2013, titled METHOD FOR PRODUCING NEGATIVE CARBON FUEL, which is a continuation of U.S. patent application Ser. No. 13/189,709, filed on Jul. 25, 2011 (now U.S. Pat. No. 8,568,493), all of the above of which are incorporated in their entirety by reference in this application.

BACKGROUND OF THE INVENTION

I. Field of the Invention

The invention relates to a method for application of biochar in agricultural environments, including trees, row crops and vineyards, and in particular, an organic soil amendment produced from plant matter that significantly improves soil quality to improve water and nutrient efficiency, and thus improves plant quality and crop yield.

II. Background

Biochar has been known for many years as a soil enhancer. It contains highly porous, high carbon content material similar to the type of very dark, fertile anthropogenic soil found in the Amazon Basin known as Terra Preta, which has very high charcoal content and is made from a mixture of charcoal, bone, and manure. Biochar is created by the pyrolysis of biomass, which generally involves heating and/or burning of organic matter, in a reduced oxygen environment, at a predetermined rate. Such heating and/or burning is stopped when the matter reaches a charcoal like stage. The highly porous material of biochar is suited to host beneficial microbes, retain nutrients, hold water and act as a delivery system for a range of beneficial compounds suited to specific applications.

Raw biochar, while known for its soil enhancing characteristics, does not always benefit soil and, depending upon the biomass from which the biochar is produced, could potentially be harmful to the soil, making it unsuitable for various types of crops or other productive uses. In particular, biochar can be detrimental, or even toxic, to 1) soil microbes involved in nutrient transport to the plant; 2) plants and 3) humans. Raw biochars derived from different biomass will have different physical and chemical properties and will behave quite differently. For example, raw biochar having pH levels too high, containing too much ash or inorganics, or containing toxins or heavy metal content too high can be harmful and/or have minimal benefit to the soil and the plant life it supports. Raw biochar can also contain unacceptable levels of residual organic compounds such as acids, esters, ethers, ketones, alcohols, sugars, phenyls, alkanes, alkenes, phenols, polychlorinated biphenyls or poly or mono aromatic hydrocarbons which are either toxic or not beneficial to plant or animal life.

Currently, because of the unpredictable results of biochar and its potential to be a detriment to plant life and growth, biochar has mostly been a scientific curiosity, has not found wide spread use, has not found large scale commercial application, and has been relegated to small niche applications. It is, however, known that biochar having certain characteristics can host beneficial microbes, retain nutrients, hold water, and act as a delivery system for a range of beneficial compounds suited to specific applications. Thus, it has been a continued desire to capture the beneficial soil enhancing characteristic of biochar. Biochar research has continued in an attempt to harness biochar having predictable, controllable, and beneficial results as a soil amendment for large scale applications.

The desire to harness the benefits of biochar in commercial agriculture exists but previous academic research has been done using rates of biochar that are not economically justifiable nor practically feasible to apply in a commercial agriculture setting.

Thus, given the known benefits of biochar, a need remains for large scale applications of biochar having generally sustainable, controllable and/or particular physical and chemical properties known to have the highest positive impact on soils and that will benefit and enhance plant life and growth in a way that is practically feasible and economical to a grower. A need exists, for an effective biochar that can be applied in a way to allow commercial agriculture to incorporate it into normal agricultural processes at a cost-effective rate in order to take advantage of biochar's ability to improve soil quality to allow for more efficient use of water and nutrients. Some possible benefits of commercially feasible, effective application of these materials are for both public and private entities to maintain trees, plants, turfs, lawns, crops, and grasses while improving soil health, potentially conserving water, and allowing for more efficient use of synthetic chemicals and nutrients—all valuable benefits in our modern world.

SUMMARY

The present invention relates to a method for applying biochar to soil, soilless media, hydroponics, or other cropping technologies and systems to allow the soil (or other) medium, and plants planted in said medium, including trees, vines, and row crops, to benefit from improved biology and microbiology in the rhizosphere, as well as being able to make better use of water and nutrients in the soil and those applied during the growing season. This can be particularly advantageous during droughts or other periods of plant stress such as intense heat, cold, or disease. By applying biochar in agricultural environments during a drought, farmers can meet statewide goals for water conservation, while still maintaining their crop yield or even increasing their plant yield without using additional fertilizer or other soil additives. In some cases this yield can even be obtained with reduced fertilization.

The method of the present invention for tree crops includes mixing porous carbonaceous particles (e.g., biochar) (where at least 95% of the particles have a particle size less than or equal to 10 mm), to soil in the root zone of the tree at a volumetric rate of 0.1% to 50%, preferably 0.3% to 20%, and even more preferably, 0.5% to 10% of biochar in the backfill. For new trees one method to do this is by mixing the biochar with the backfill at the said volumetric rate and applying approximately half the mixture first to the bottom of the hole prepared for planting a new tree, and applying the remaining half of the mixture around the root ball of the newly planted tree during planting. In some cases, the biochar may be treated or processed in accordance with the methods outlined in U.S. patent application Ser. No. 14/873,053, or other related work which has been incorporated into this application previously by reference. In yet other cases, the biochar in this, or the following application methods may be treated or processed to enhance certain characteristics, such as pH, hydrophilicity, ion exchange, or removal of other deleterious substances which may impede positive benefits. Many of these modifications can be important in improving the efficacy of application—especially at lower rates.

When applying to existing tree crops, the method may include top dressing the area of soil or turf under the tree canopy in the drip zone of an existing tree with a layer of such carbonaceous particles. These particles may then be incorporated into the top 2-3" of soil to get to the target percentage of 0.1% to 50% by volume in the targeted area, preferably 0.3% to 20%, and even more preferably, 0.5% to 10%. For deeper rooted or more established trees, an auger or air spade device may be used to get the particles into the deeper root zones 4 to 12" deep, with a preferred (but not mandatory) objective being to deliver the proper concentration of material within the vicinity of developing, juvenile plant root tissue.

When applying to new row crop beds prior to planting, the method may include the steps of spreading such carbonaceous particles along the top of row crop beds prior to planting using a broadcast spreader and incorporating the particles into the top 2-6" of the bed. In order to be more efficient and thus economical a more focused application method can be used to target the 0.1% to 50% volumetric rate targeting mostly the root zones of the crop plants and thus reducing the application rate measured in cubic yards per acre. One method for doing this is to lay a band of carbonaceous materials in the plant row prior to planting that measures between 2 and 18 inches and then incorporating into the top 2-6" of soil using one of many well-known agricultural techniques for mixing or incorporating a material into soil, such as tilling, plowing, ripping, bedding, or drilling. This application can be done alone, or in a combination with other agricultural inputs such as fertilizers, biologicals, soil amendments, pesticides or even the seeds themselves.

When the row crops are vines, it may be desirable to plant the carbonaceous particles deeper into the beds, such as the top 4-6" of the bed, or alternatively mixing them in with backfill of individual vine holes. For existing vineyards, the method may include side dressing rows of existing vines with such carbonaceous particles using a compost spreader and incorporating them into 4-12" of the side of the bed by shanking or disking.

In all of the above methods, the porous carbonaceous particles applied may be treated or enhanced porous carbonaceous particles, which may be treated, for example, by infusing a liquid into the pores of the plurality of porous carbonaceous particles.

As demonstrated below, the biochar applied to trees, row crops and vines by means of the present invention increases the retention of water and nutrients in the soil which is an enabler for superior soils rich with organic matter and microbial life. The application results in visibly fuller trees, crops and vines with improved vitality and longevity that can be maintained with less water and/or fertilizer.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention.

DETAILED DESCRIPTION OF THE INVENTION

Figure 1:
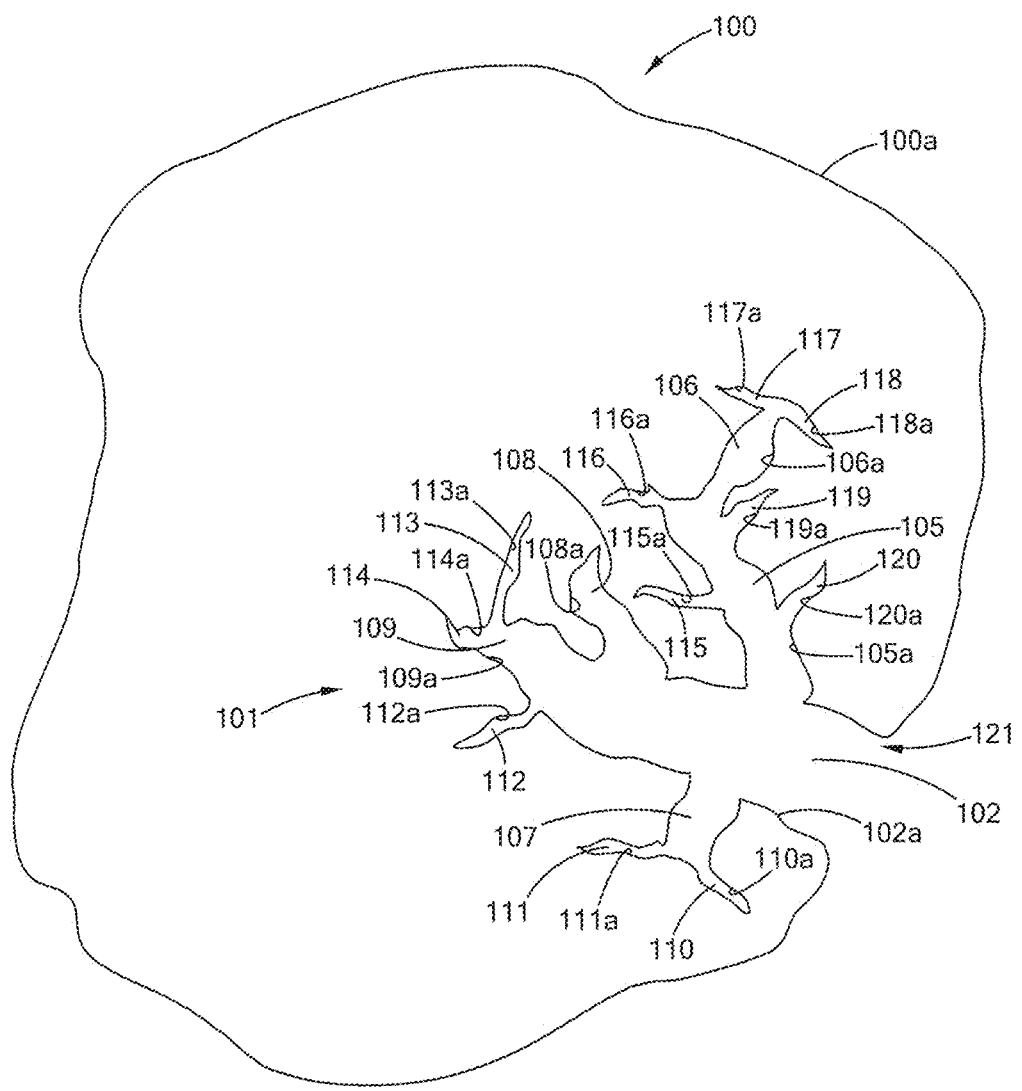
FIG. 1 illustrates a cross-section of one example of a raw biochar particle.

As illustrated in the attached figures, the present invention relates to a method for applying biochar to trees, row crops and vines to reduce water consumption by increasing overall water holding capacity of the soil, as well as increase plant growth and their yield. As described below, raw biochar may be treated to increase the water holding and retention capacities of the overall soil. Through treatment, the properties of the raw biochar can be modified to significantly increase the biochar's ability to retain water and/or nutrients while also, in many cases, creating an environment beneficial to microorganisms. The processing of the biochar can also ensure that the pH of biochar used in the present application is suitable for creating soil conditions beneficial for tree, row crop and vine growth, which has been a challenge for raw biochars.

For purposes of this application, the term "biochar" shall be given its broadest possible meaning and shall include any solid materials obtained from the pyrolysis, torrefaction, gasification or any other thermal and/or chemical conversion of a biomass, where the biochar contains at least 55% carbon based upon weight. Pyrolysis is generally defined as a thermochemical decomposition of organic material at elevated temperatures in the absence of, or with reduced levels of oxygen.

For purposes of this application, biochar may include, but not be limited to, BMF char disclosed and taught by U.S. Pat. No. 8,317,891, which is incorporated into this application by reference, and those materials falling within the IBI and AAPFCO definition of biochar. When the biochar is referred to as "treated" or undergoes "treatment," it shall mean raw, pyrolyzed biochar that has undergone additional physical, biological, and/or chemical processing.

As used herein, unless specified otherwise, the terms "carbonaceous", "carbon based", "carbon containing", and similar such terms are to be given their broadest possible meaning, and would include materials containing carbon in various states, crystallinities, forms and compounds.

As used herein, unless stated otherwise, room temperature is 25° C. And, standard temperature and pressure is 25° C. and 1 atmosphere. Unless stated otherwise, generally, the term "about" is meant to encompass a variance or range of ±10%, the experimental or instrument error associated with obtaining the stated value, and preferably the larger of these.

For the purposes of this application: (a) "tree" shall have the broadest possible interpretation and apply to trees, shrubs, or other tree-like plants, agricultural, ornamental or otherwise, that produce edible fruit, nuts or seeds, make an area aesthetically more pleasing or more suitable for outdoor activities, reduce soil erosion, or other applications; (b) "row crop" shall have the broadest possible interpretation and apply to any plant grown as a crop, whether in, on or above ground; and (c) "vine" shall have the broadest possible interpretation and apply to vines producing fruit of any type or variety, whether for direct consumption of the fruit itself (e.g. table grapes), fruit derivatives (e.g. jams or jellies) or for production of beverages (e.g. wine or grape juice).

A. Biochars

Typically, biochars include porous carbonaceous materials, such as charcoal, that are used as soil amendments or other suitable applications. Biochar most commonly is created by pyrolysis of a biomass. In addition to the benefits to plant growth, yield and quality, etc.; biochar provides the benefit of reducing carbon dioxide ($CO_2$) in the atmosphere by serving as a method of carbon sequestration. Thus, biochar has the potential to help mitigate climate change, via carbon sequestration. However, to accomplish this important, yet ancillary benefit, to any meaningful extent, the use of biochar in agricultural applications must become widely accepted, e.g., ubiquitous. Unfortunately, because of the prior failings in the biochar arts, this has not occurred. It is believed that with the solutions of the present invention may this level of use of biochar be achieved; and more importantly, yet heretofore unobtainable, realize the benefit of significant carbon sequestration.

In general, one advantage of putting biochar in soil includes long term carbon sequestration. It is theorized that as worldwide carbon dioxide emissions continue to mount, benefits may be obtained by, controlling, mitigating and reducing the amount of carbon dioxide in the atmosphere and the oceans. It is further theorized that increased carbon dioxide emissions are associated with the increasing industrial development of developing nations, and are also associated with the increase in the world's population. In addition to requiring more energy, the increasing world population will require more food. Thus, rising carbon dioxide emissions can be viewed as linked to the increasing use of natural resources by an ever increasing global population. As some suggest, this larger population brings with it further demands on food production requirements. Biochar uniquely addresses both of these issues by providing an effective carbon sink, e.g., carbon sequestration agent, as well as, an agent for improving and increasing agricultural output. In particular, biochar is unique in its ability to increase agricultural production, without increasing carbon dioxide emission, and preferably reducing the amount of carbon dioxide in the atmosphere. However, as discussed above, this unique ability of biochar has not been realized, or seen, because of the inherent problems and failings of prior biochars including, for example, high pH, phytotoxicity due to high metals content and/or residual organics, and dramatic product inconsistencies.

Biochar can be made from basically any source of carbon, for example, from hydrocarbons (e.g., petroleum based materials, coal, lignite, peat) and from a biomass (e.g., woods, hardwoods, softwoods, waste paper, coconut shell, manure, chaff, food waste, etc.). Combinations and variations of these starting materials, and various and different members of each group of starting materials can be, and are, used. Thus, the large number of vastly different starting materials leads to biochars having different properties.

Many different pyrolysis or carbonization processes can be, and are used to create biochars. In general, these processes involve heating the starting material under positive pressure, reduced pressure, vacuum, inert atmosphere, or flowing inert atmosphere, through one or more heating cycles where the temperature of the material is generally brought above about 400° C., and can range from about 300° C. to about 900° C. The percentage of residual carbon formed and several other initial properties are strong functions of the temperature and time history of the heating cycles. In general, the faster the heating rate and the higher the final temperature the lower the char yield. Conversely, in general, the slower the heating rate or the lower the final temperature the greater the char yield. The higher final temperatures also lead to modifying the char properties by changing the inorganic mineral matter compositions, in addition to surface organic chemistries, which in turn, modify the char properties. Ramp, or heating rates, hold times, cooling profiles, pressures, flow rates, and type of atmosphere can all be controlled, and typically are different from one biochar supplier to the next. These differences potentially lead to a biochar having different properties, further framing the substantial nature of one of the problems that the present inventions address and solve. Generally, in carbonization most of the non-carbon elements, hydrogen and oxygen are first removed in gaseous form by the pyrolytic decomposition of the starting materials, e.g., the biomass. The free carbon atoms group or arrange into crystallographic formations known as elementary graphite crystallites. Typically, at this point the mutual arrangement of the crystallite is irregular, so that free interstices exist between them. Thus, pyrolysis involves thermal decomposition of carbonaceous material, e.g., the biomass, eliminating non-carbon species, and producing a fixed carbon structure.

As noted above, raw or untreated biochar is generally produced by subjecting biomass to either a uniform or varying pyrolysis temperature (e.g., 300° C. to 550° C. to 750° C. or more) for a prescribed period of time in a reduced oxygen environment. This process may either occur quickly, with high reactor temperature and short residence times, slowly with lower reactor temperatures and longer residence times, or anywhere in between. To achieve better results, the biomass from which the char is obtained may be first stripped of debris, such as bark, leaves and small branches, although this is not necessary. The biomass may further include feedstock to help adjust the pH, cationic and anionic exchange capacity, hydrophilicity, and particle size distribution in the resulting raw biochar. In some applications, it is desirous to have biomass that is fresh, less than six months old, and with an ash content of less than 3%. Further, by using biochar derived from different biomass, e.g., pine, oak, hickory, birch and coconut shells from different regions, and understanding the starting properties of the raw biochar, the treatment methods can be tailored to ultimately yield a treated biochar with predetermined, predictable physical and chemical properties. Additionally, the biomass may be treated with various organic or inorganic substances prior to pyrolysis to impact the reactivity of the material during pyrolysis and/or to potentially be fixed in place and available for reaction with various substances during the treatment process after pyrolysis. Trace materials, usually in gaseous form, but potentially in other forms, may also be injected during the pyrolysis process with the intention of either modifying the characteristics of the raw biochar produced, or for potential situation on the raw biochar so that those materials, or a descendant material created by thermal or chemical reaction during pyrolysis, may be reacted with other compounds during the treatment process.

In general, biochar particles can have a very wide variety of particle sizes and distributions, usually reflecting the sizes occurring in the input biomass. Additionally, biochar can be ground, sieved, strained, or crushed after pyrolysis to further modify the particle sizes. Typically, for agricultural uses, biochars with consistent, predictable particle sizes are more desirable. By way of example, the biochar particles can have particle sizes as shown or measured in Table 1 below. When referring to a batch having ¼ inch particles, the batch would have particles that will pass through a 3 mesh sieve, but will not pass through (i.e., are caught by or sit atop) a 4 mesh sieve.

TABLE 1

| U.S. Mesh (i.e., mesh) | Inches | Microns (µm) | Millimeters (mm) |
| --- | --- | --- | --- |
| 3 | 0.2650 | 6730 | 6.370 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

For most basic agricultural applications, it is desirable to use biochar particles having particle sizes from about 3/4 mesh to about 60/70 mesh, about 4/5 mesh to about 20/25 mesh, or about 4/5 mesh to about 30/35 mesh. However, for applications such as seed treatment, or microbial carriers, smaller mesh sizes ranging from 200, to 270, to 325, to 400 mesh or beyond may be desirable. It is understood that the desired mesh size, and mesh size distribution can vary depending upon a particular application for which the biochar is intended.

FIG. 1 illustrates a cross-section of one example of a raw biochar particle. As illustrated in FIG. 1, a biochar particle 100 is a porous structure that has an outer surface 100a and a pore structure 101 formed within the biochar particle 100. As used herein, unless specified otherwise, the terms "porosity", "porous", "porous structure", and "porous morphology" and similar such terms are to be given their broadest possible meaning, and would include materials having open pores, closed pores, and combinations of open and closed pores, and would also include macropores, mesopores, and micropores and combinations, variations and continuums of these morphologies. Unless specified otherwise, the term "pore volume" is the total volume occupied by the pores in a particle or collection of particles; the term "inter-particle void volume" is the volume that exists between a collection of particle; the term "solid volume or volume of solid means" is the volume occupied by the solid material and does not include any free volume that may be associated with the pore or inter-particle void volumes; and the term "bulk volume" is the apparent volume of the material including the particle volume, the inter-particle void volume, and the internal pore volume.

The pore structure 101 forms an opening 121 in the outer surface 100a of the biochar particle 100. The pore structure 101 has a macropore 102, which has a macropore surface 102a, and which surface 102a has an area, i.e., the macropore surface area. (In this diagram only a single micropore is shown. If multiple micropores are present than the sum of their surface areas would equal the total macropore surface area for the biochar particle.) From the macropore 102, several mesopores 105, 106, 107, 108 and 109 are present, each having its respective surfaces 105a, 106a, 107a, 108a and 109a. Thus, each mesopore has its respective surface area; and the sum of all mesopore surface areas would be the total mesopore surface area for the particle. From the mesopores, e.g., 107, there are several micropores 110, 111, 112, 113, 114, 115, 116, 117, 118, 119 and 120, each having its respective surfaces 110a, 111a, 112a, 113a, 114a, 115a, 116a, 117a, 118a, 119a and 120a. Thus, each micropore has its respective surface area and the sum of all micropore surface areas would be the total micropore surface area for the particle. The sum of the macropore surface area, the mesopore surface area and the micropore surface area would be the total pore surface area for the particle.

Macropores are typically defined as pores having a diameter greater than 300 nm, mesopores are typically defined as diameter from about 1-300 nm, and micropores are typically defined as diameter of less than about 1 nm, and combinations, variations and continuums of these morphologies. The macropores each have a macropore volume, and the sum of these volumes would be the total macropore volume. The mesopores each have a mesopore volume, and the sum of these volumes would be the total mesopore volume. The micropores each have a micropore volume, and the sum of these volumes would be the total micropore volume. The sum of the macropore volume, the mesopore volume and the micropore volume would be the total pore volume for the particle.

Additionally, the total pore surface area, volume, mesopore volume, etc., for a batch of biochar would be the actual, estimated, and preferably calculated sum of all of the individual properties for each biochar particle in the batch.

It should be understood that the pore morphology in a biochar particle may have several of the pore structures shown, it may have mesopores opening to the particle surface, it may have micropores opening to particle surface, it may have micropores opening to macropore surfaces, or other combinations or variations of interrelationship and structure between the pores. It should further be understood that the pore morphology may be a continuum, where moving inwardly along the pore from the surface of the particle, the pore transitions, e.g., its diameter becomes smaller, from a macropore, to a mesopore, to a micropore, e.g., macropore 102 to mesopore 109 to micropore 114.

In general, most biochars have porosities that can range from 0.2 $cm^3/cm^3$ to about 0.8 $cm^3/cm^3$ and more preferably about 0.2 $cm^3/cm^3$ to about 0.5 $cm^3/cm^3$ (Unless stated otherwise, porosity is provided as the ratio of the total pore volumes (the sum of the micro+meso+macro pore volumes) to the solid volume of the biochar. Porosity of the biochar particles can be determined, or measured, by measuring the micro-, meso-, and macro pore volumes, the bulk volume, and the inter particle volumes to determine the solid volume by difference. The porosity is then calculated from the total pore volume and the solid volume.

Figure 2:
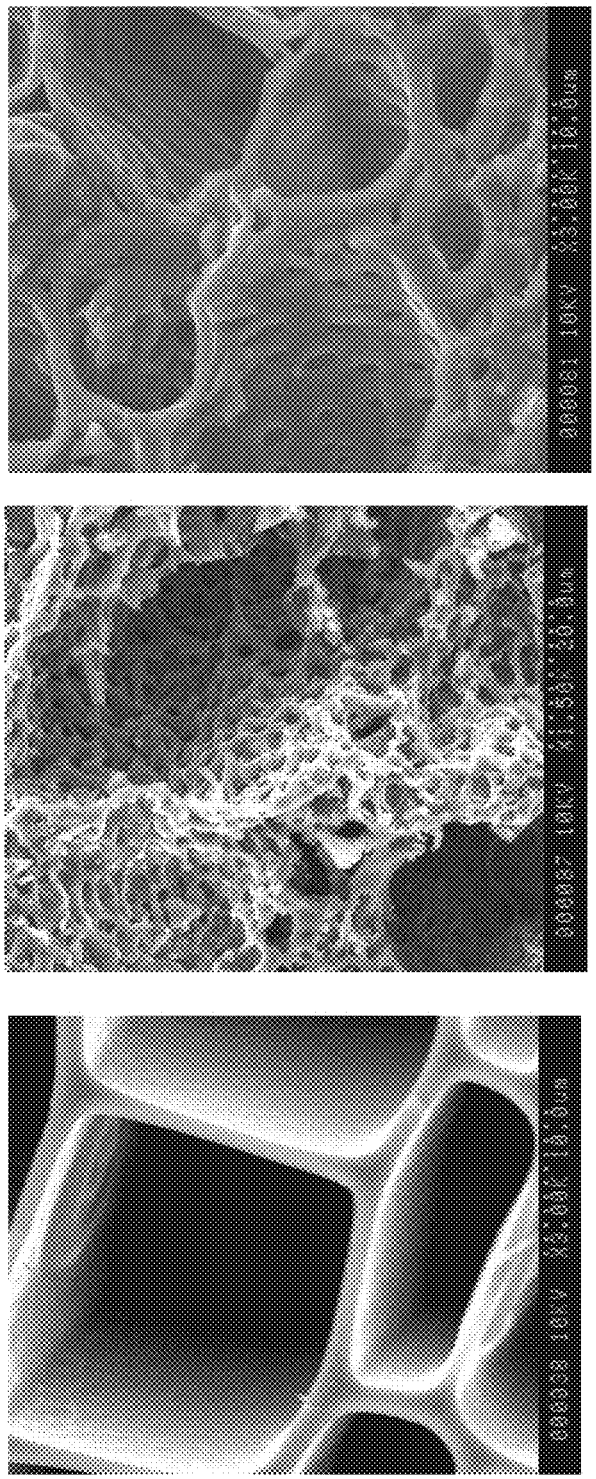
FIG. 2a is a SEM (10 KV×3.00K 10.0 μm) of pore morphology of treated biochar made from pine.
FIG. 2b is a SEM (10 KV×3.00K 10.0 μm) of pore morphology of treated biochar made from birch.
FIG. 2c is a SEM (10 KV×3.00K 10.0 μm) of pore morphology of treated biochar made from coconut shells.

As noted above, the use of different biomass potentially leads to biochars having different properties, including, but not limited to different pore structures. By way of example, FIGS. 2A, 2B and 2C illustrate Scanning Electron Microscope ("SEM") images of various types of treated biochars showing the different nature of their pore morphology. FIG. 2A is biochar derived from pine. FIG. 2B is biochar derived from birch. FIG. 2C is biochar derived from coconut shells.

The surface area and pore volume for each type of pore, e.g., macro-, meso- and micro- can be determined by direct measurement using $CO_2$ adsorption for micro-, $N_2$ adsorption for meso- and macro pores and standard analytical surface area analyzers and methods, for example, particle analyzers such as Micrometrics instruments for meso- and micro pores and impregnation capacity for macro pore volume. Mercury porosimetry, which measures the macroporosity by applying pressure to a sample immersed in mercury at a pressure calibrated for the minimum pore diameter to be measured, may also be used to measure pore volume.

Figure 3:
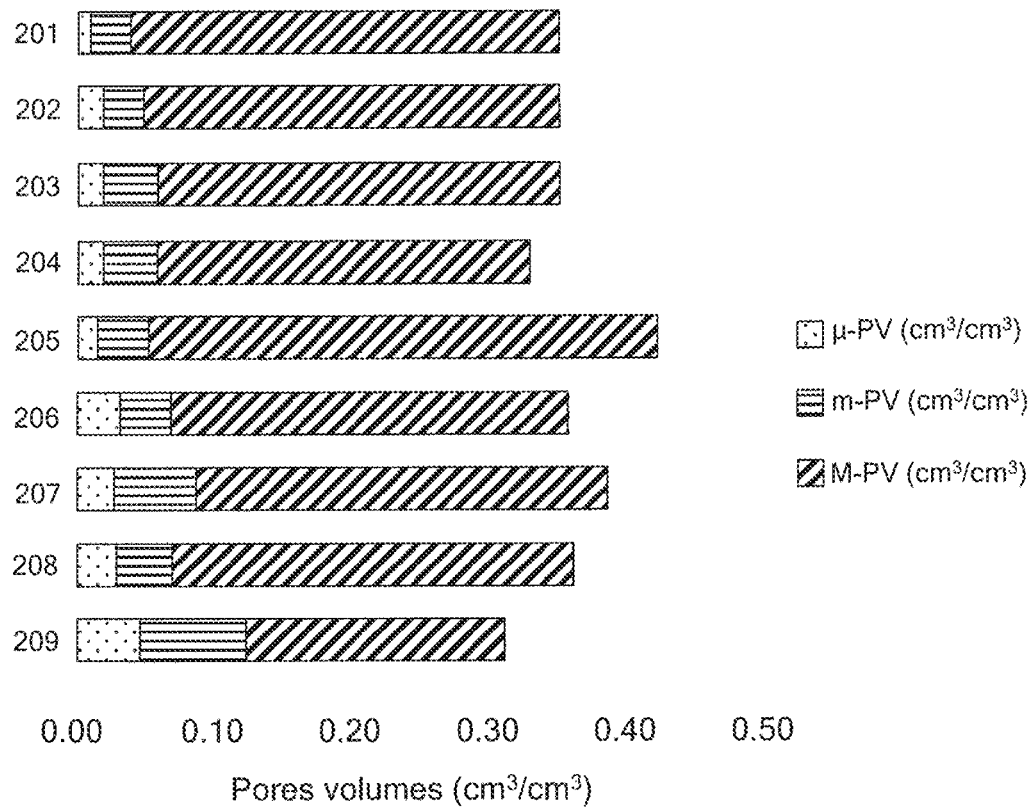
FIG. 3 is a chart showing porosity distribution of various biochars.

The total micropore volume can be from about 2% to about 25% of the total pore volume. The total mesopore volume can be from about 4% to about 35% of the total pore volume. The total macropore volume can be from about 40% to about 95% of the total pore volume. By way of example, FIG. 3 shows a bar chart setting out examples of the pore volumes for sample biochars made from peach pits 201, juniper wood 202, a first hard wood 203, a second hard wood 204, fir and pine waste wood 205, a first pine 206, a second pine 207, birch 208 and coconut shells 209.

As explained further below, treatment can increase usable pore volumes and, among other things, remove obstructions in the pores, which leads to increased retention properties and promotes further performance characteristics of the biochar. Knowing the properties of the starting raw biochar, one can treat the biochar to produce controlled, predictable and optimal resulting physical and chemical properties.

B. Treatment

The rationale for treating the biochar after pyrolysis is that given the large internal pore volume and large interior surface are of the biochars, it is most efficient to make significant changes in the physical and chemical properties of the biochar by treating both the internal and external surfaces and internal pore volume of the char. Testing has demonstrated that if the biochar is treated, at least partially, in a manner that causes the forced infusion and/or diffusion of liquids and/or vapors into and/or out of the biochar pores (through mechanical, physical, or chemical means), certain properties of the biochar can be altered or improved over and above simply contacting these liquids with the biochar. By knowing the properties of the raw biochar and the optimal desired properties of the treated biochar, the raw biochar can then be treated in a manner that results in the treated biochar having controlled optimized properties.

For purposes of this application, treating and/or washing the biochar in accordance with the present invention involves more than simply contacting, washing or soaking, which generally only impacts the exterior surfaces and a small percentage of the interior surface area. "Washing" or "treating" in accordance with the present invention, and as used below, involves treatment of the biochar in a manner that causes the forced, accelerated or assisted infusion and/or diffusion of liquids, vapors, and/or additivities into and/or out of the biochar pores (through mechanical, physical, biological, or chemical means) such that certain properties of the biochar can be altered or improved over and above simply contacting these liquids with the biochar or so that treatment becomes more efficient or rapid from a time standpoint over simple contact or immersion.

In particular, effective treatment processes can mitigate deleterious pore surface properties, remove undesirable substances from pore surfaces or volume, and impact anywhere from between 10% to 99% or more of pore surface area of a biochar particle. By modifying the usable pore surfaces through treatment and/or removing deleterious substances from the pore volume, the treated biochars can exhibit a greater capacity to retain water and/or other nutrients as well as being more suitable habitats for some forms of microbial life. Through the use of treated biochars, agricultural applications can realize increased moisture control, increased nutrient retention, reduced water usage, reduced water requirements, reduced runoff or leaching, increased nutrient efficiency, reduced nutrient usage, increased yields, increased yields with lower water requirements and/or nutrient requirements, increases in beneficial microbial life, improved performance and/or shelf life for inoculated bacteria, increased efficacy as a substrate for microbial growth or fermentation, and any combination and variation of these and other benefits.

Treatment further allows the biochar to be modified to possess certain known properties that enhance the benefits received from the use of biochar. While the selection of feedstock, raw biochar and/or pyrolysis conditions under which the biochar was manufactured can make treatment processes less cumbersome, more efficient and further controlled, treatment processes can be utilized that provide for the biochar to have desired and generally sustainable resulting properties regardless of the biochar source or pyrolysis conditions. As explained further below, treatment can (i) repurpose problematic biochars, (ii) handle changing biochar material sources, e.g., seasonal and regional changes in the source of biomass, (iii) provide for custom features and functions of biochar for particular soils, regions or agricultural purposes; (iv) increase the retention properties of biochar, (v) provide for large volumes of biochar having desired and predictable properties, (vi) provide for biochar having custom properties, (vii) handle differences in biochar caused by variations in pyrolysis conditions or manufacturing of the "raw" biochar; and (viii) address the majority, if not all, of the problems that have, prior to the present invention, stifled the large scale adoption and use of biochars.

Treatment can impact both the interior and exterior pore surfaces, remove harmful chemicals, introduce beneficial substances, and alter certain properties of the biochar and the pore surfaces and volumes. This is in stark contrast to simple washing, contact, or immersion which generally only impacts the exterior surfaces and a small percentage of the interior surface area. Treatment can further be used to coat substantially all of the biochar pore surfaces with a surface modifying agent or impregnate the pore volume with additives or treatment to provide a predetermined feature to the biochar, e.g., surface charge and charge density, surface species and distribution, targeted nutrient addition, magnetic modifications, root growth facilitator, and water absorptivity and water retention properties. Just as importantly, treatment can also be used to remove undesirable substances from the biochar, such as dioxins or other toxins either through physical removal or through chemical reactions causing neutralization.

Figure 4:
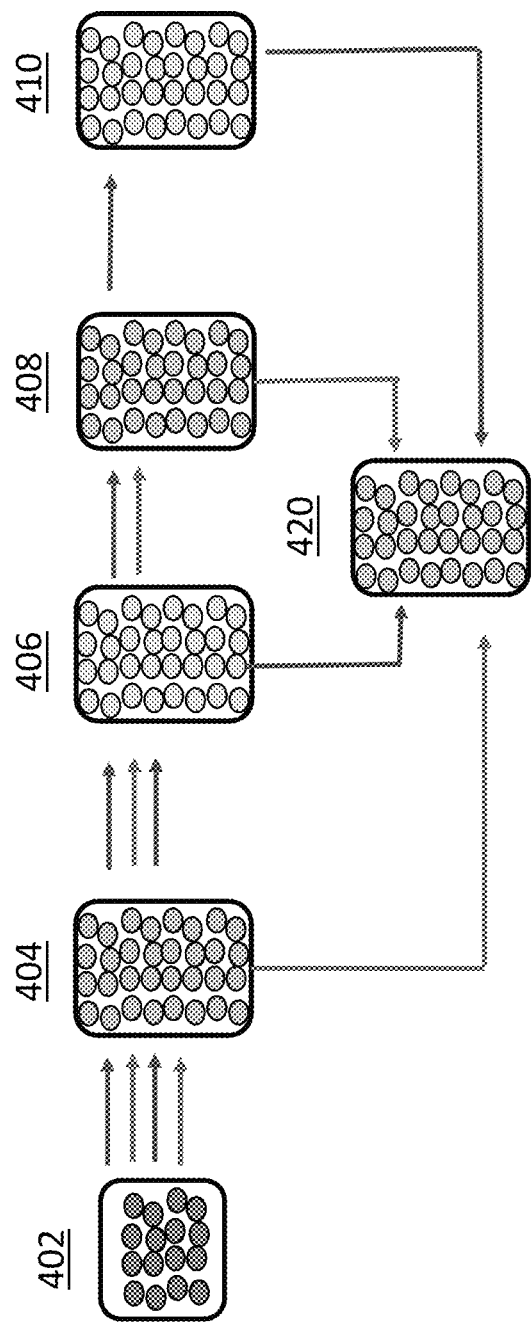
FIG. 4 is a flow chart process diagram of one implementation of a process for treating the raw biochar in accordance with the invention.

FIG. 4 is a schematic flow diagram of one example treatment process 400 for use in accordance with the present invention. As illustrated, the treatment process 400 starts with raw biochar 402 that may be subjected to one or more reactors or treatment processes prior to bagging 420 the treated biochar for resale. For example, 404 represents reactor 1, which may be used to treat the biochar. The treatment may be a simple water wash or may be an acid wash used for the purpose of altering the pH of the raw biochar particles 402. The treatment may also contain a surfactant or detergent to aid the penetration of the treatment solution into the pores of the biochar. The treatment may optionally be heated, cooled, or may be used at ambient temperature or any combination of the three. For some applications, depending upon the properties of the raw biochar, a water and/or acid/alkaline wash 404 (the latter for pH adjustment) may be the only necessary treatment prior to bagging the biochar 420. If, however, the moisture content of the biochar needs to be adjusted, the treated biochar may then be put into a second reactor 406 for purposes of reducing the moisture content in the washed biochar. From there, the treated and moisture adjusted biochar may be bagged 420.

Again, depending upon the starting characteristics of the raw biochar and the intended application for the resale product, further processing may still be needed or desired. In this case, the treated moisture adjusted biochar may then be passed to a third reactor 408 for inoculation, which may include the impregnation of biochar with beneficial additives, such as nutrients, bacteria, microbes, fertilizers or other additives. Thereafter, the inoculated biochar may be bagged 420, or may be yet further processed, for example, in a fourth reactor 410 to have further moisture removed from or added to the biochar. Further moisture adjustment may be accomplished by placing the inoculated biochar in a fourth moisture adjustment reactor 410 or circulating the biochar back to a previous moisture adjustment reactor (e.g. reactor 406). Those skilled in the art will recognize that the ordering in which the raw biochar is processed and certain processes may be left out, depending on the properties of the starting raw biochar and the desired application for the biochar. For example, the treatment and inoculation processes may be performed without the moisture adjustment step, inoculation processes may also be performed with or without any treatment, pH adjustment or any moisture adjustment. All the processes may be completed alone or in the conjunction with one or more of the others. It should also be noted that microbes themselves may be part of the process, not simply as an inoculant, but as an agent to convey materials into or out of the pore volume of the biochar.

Figure 4A:
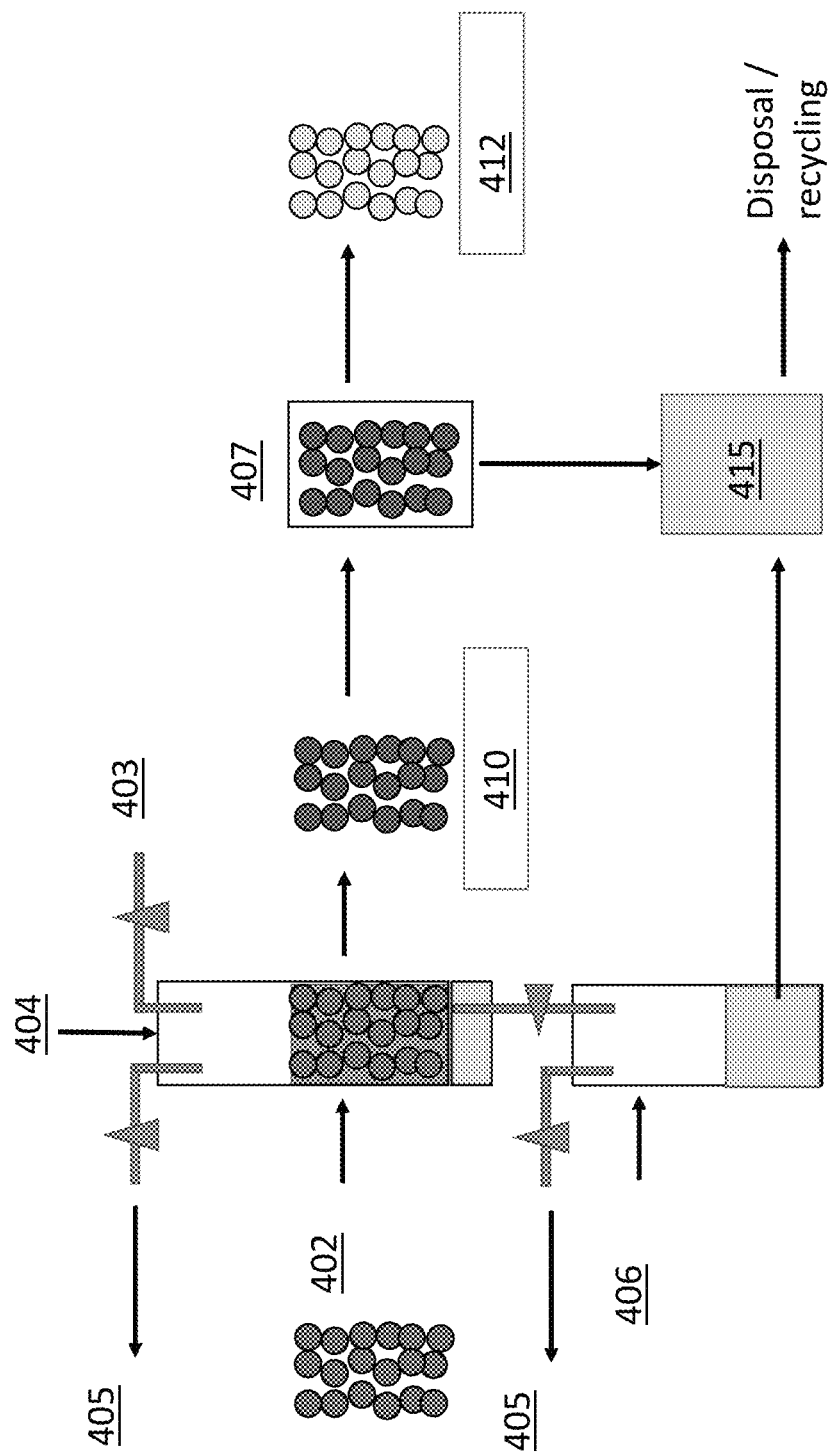
FIG. 4a illustrates a schematic of one example of an implementation of a biochar treat processes that that includes washing, pH adjustment and moisture adjustment.
Figure 4B:
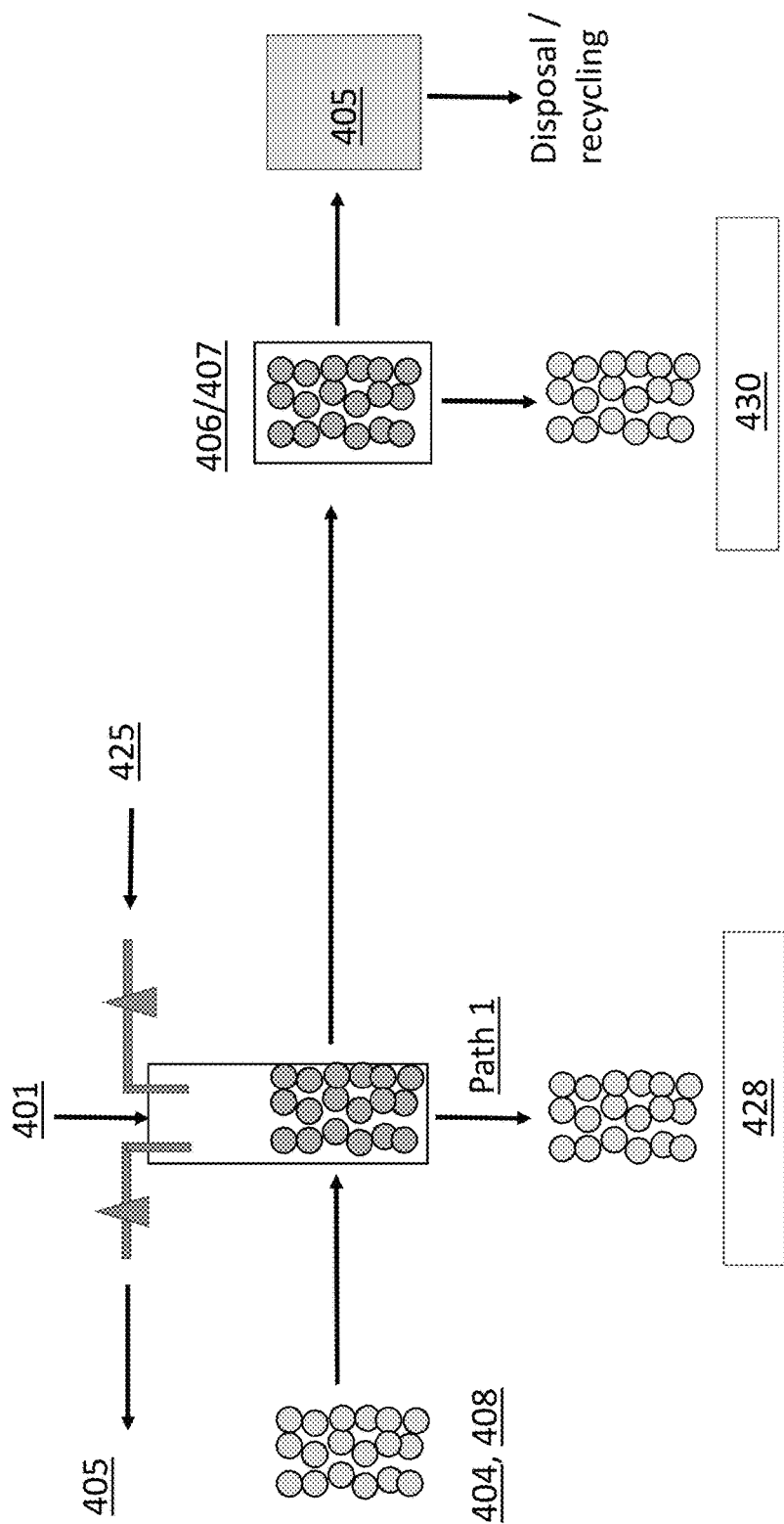
FIG. 4b illustrates yet another example of an implementation of a biochar treatment processing that includes inoculation.

For example, FIG. 4a illustrates a schematic of one example of an implementation of biochar processing that includes washing the pores and both pH and moisture adjustment. FIG. 4b illustrates yet another example of an implementation of biochar processing that includes inoculation.

As illustrated in FIG. 4a, raw biochar 402 is placed into a reactor or tank 404. A washing or treatment liquid 403 is then added to a tank and a partial vacuum, using a vacuum pump, 405 is pulled on the tank. The treating or washing liquid 403 may be used to clean or wash the pores of the biochar 402 or adjust the chemical or physical properties of the surface area or pore volume, such as pH level, usable pore volume, or VOC content, among other things. The vacuum can be applied after the treatment liquid 403 is added or while the treatment liquid 403 is added. Thereafter, the washed/adjusted biochar 410 may be moisture adjusted by vacuum exfiltration 406 to pull the extra liquid from the washed/moisture adjusted biochar 410 or may be placed in a centrifuge 407, heated or subjected to pressure gradient changes (e.g., blowing air) for moisture adjustment. The moisture adjusted biochar 412 may then be bagged or subject to further treatment. Any excess liquids 415 collected from the moisture adjustment step may be disposed of or recycled, as desired. Optionally, biochar fines may be collected from the excess liquids 415 for further processing, for example, to create a slurry, cakes, or biochar extrudates. It should be noted that in any of these steps, the residual gaseous environment in the tanks or centrifuges may be either ambient air, or a prescribed gas or combination of gasses to impact (through assistance or attenuation) reactivity during the process.

Optionally, rather than using a vacuum pump 405, a positive pressure pump may be used to apply positive pressure to the tank 404. In some situations, applying positive pressure to the tank may also function to force or accelerate the washing or treating liquid 403 into the pores of the biochar 402. Any change in pressure in the tank 404 or across the surface of the biochar could facilitate the exchange of gas and/or moisture into and out of the pores of the biochar with the washing or treating liquid 403 in the tank. Accordingly, changing the pressure in the tank and across the surface of the biochar, whether positive or negative, is within the scope of this invention. The atmosphere of the tank may be air or other gaseous mixture, prior to the intuition of the pressure change.

As illustrated FIG. 4b, the washed/adjusted biochar 410 or the washed/adjusted and moisture adjusted biochar 412 may be further treated by inoculating or impregnating the pores of the biochar with an additive 425. The biochar 410, 412 placed back in a reactor 401, an additive solution 425 is placed in the reactor 401 and a vacuum, using a vacuum pump, 405 is applied to the tank. Again, the vacuum can be applied after the additive solution 425 is added to the tank or while the additive solution 425 is being added to the tank. Thereafter, the washed, adjusted and inoculated biochar 428 can be bagged. Alternatively, if further moisture adjustment is required, the biochar can be further moisture adjusted by vacuum filtration 406 to pull the extra liquid from the washed/moisture adjusted biochar 410 or may be placed in a centrifuge 407 for moisture adjustment. The resulting biochar 430 can then be bagged. Any excess liquids 415 collected from the moisture adjustment step may be disposed of or recycled, as desired. Optionally, biochar particulates or "fines" which easily are suspended in liquid may be collected from the excess liquids 415 for further processing, for example, to create a slurry, biochar extrudates, or merely a biochar product of a consistently smaller particle size. As described above, both processes of the FIGS. 4a and 4b can be performed with a surfactant solution in place of, or in conjunction with, the vacuum 405.

While known processes exist for the above described processes, research associated with the present invention has shown improvement and the ability to better control the properties and characteristics of the biochar if the processes are performed through the infusion and diffusion of liquids into and out of the biochar pores. One such treatment process that can be used is vacuum impregnation and vacuum and/or centrifuge extraction. Another such treatment process that can be used is the addition of a surfactant to infused liquid, which infused liquid may be optionally heated, cooled, or used at ambient temperature or any combination of the three.

Since research associated with the present invention has identified what physical and chemical properties have the highest impact on plant growth and/or soil health, the treatment process can be geared to treat different forms of raw biochar to achieve treated biochar properties known to enhance these characteristics. For example, if the pH of the biochar needs to be adjusted to enhance the raw biochar performance properties, the treatment may be the infusion of an acid solution into the pores of the biochar using vacuum, surfactant, or other treatment means. This treatment of pore infusion through, for example, the rapid, forced infusion of liquid into and out the pores of the biochar, has further been proven to sustain the adjusted pH levels of the treated biochar for much longer periods than biochar that is simply immersed in an acid solution for the same period of time. By way of another example, if the moisture content needs to be adjusted, then excess liquid and other selected substances (e.g. chlorides, dioxins, and other chemicals, to include those previously deposited by treatment to catalyze or otherwise react with substances on the interior or exterior surfaces of the biochar) can be extracted from the pores using vacuum and/or centrifuge extraction or by using various heating techniques. The above describes a few examples of treatment that result in treated biochar having desired performance properties identified to enhance soil health and plant life or other applications.

Figure 5:
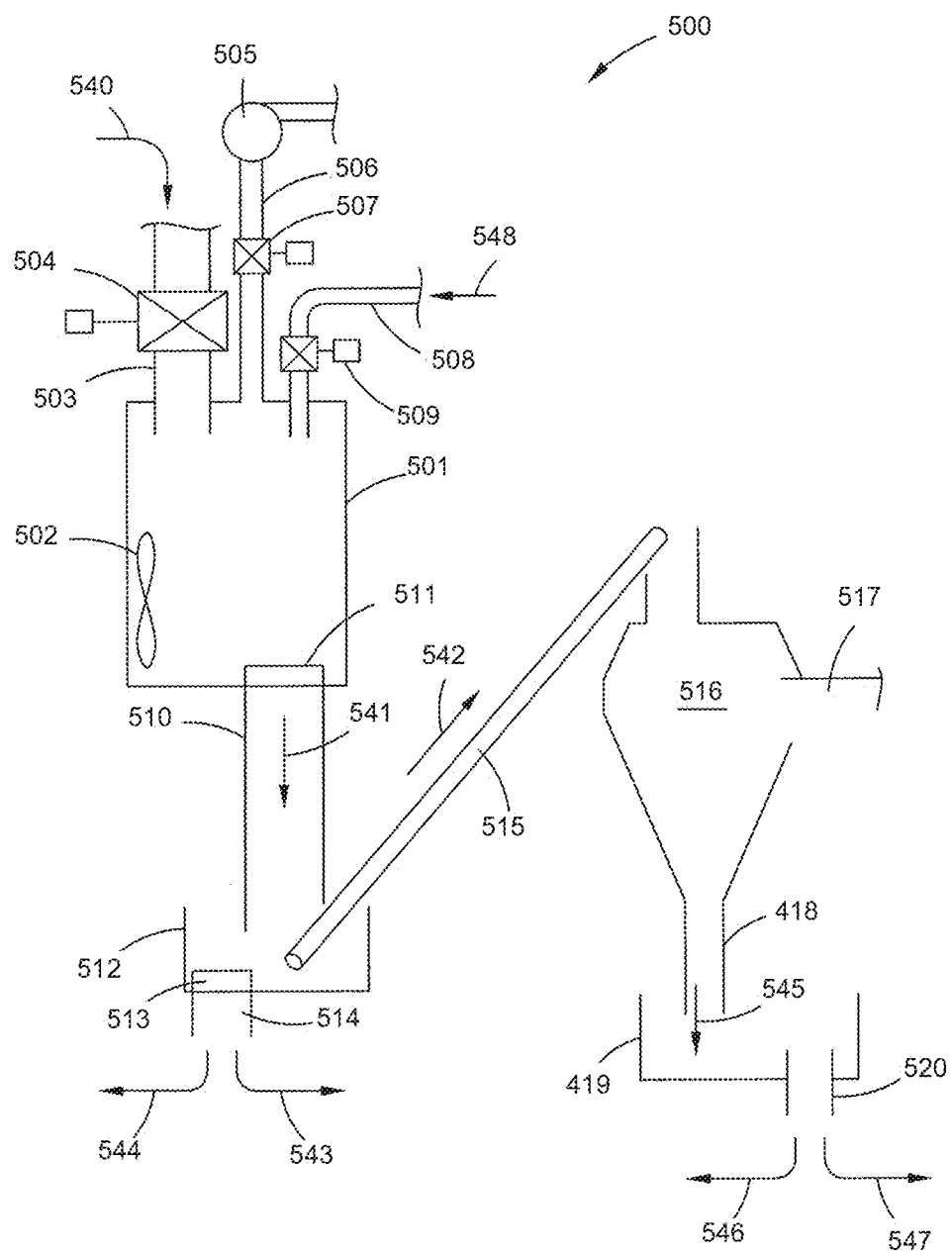
FIG. 5 is a schematic flow diagram of one example of a treatment system for use in accordance with the present invention.

FIG. 5 illustrates one example of a system 500 that utilizes vacuum impregnation to treat raw biochar. Generally, raw biochar particles, and preferably a batch of biochar particles, are placed in a reactor, which is connected to a vacuum pump, and a source of treating liquid (i.e. water or acidic/basis solution). When the valve to the reactor is closed, the pressure in the reactor is reduced to values ranging from 750 Torr to 400 Torr to 10 Torr or less. The biochar is maintained under vacuum ("vacuum hold time") for anywhere from seconds to 1 minute to 10 minutes, to 100 minutes, or possibly longer. By way of example, for about a 500 pound batch of untreated biochar, a vacuum hold time of from about 1 to about 5 minutes can be used if the reactor is of sufficient size and sufficient infiltrate is available to adjust the necessary properties. While under the vacuum the treating liquid may then be introduced into the vacuum chamber containing the biochar. Alternatively, the treating liquid may be introduced into the vacuum chamber before the biochar is placed under a vacuum. Optionally, treatment may also include subjecting the biochar to elevated temperatures from ambient to about 250° C. or reduced temperatures to about −25° C. or below, with the limiting factor being the temperature and time at which the infiltrate can remain flowable as a liquid or semi-liquid.

The infiltrate or treating liquid is drawn into the biochar pore, and preferably drawn into the macropores and mesopores. Depending upon the specific doses applied and pore structure of the biochar, the infiltrate can coat anywhere from 10% to 50% to 100% of the total macropore and mesopore surface area and can fill or coat anywhere from a portion to nearly all (10%-100%) of the total macropore and mesopore volume.

As described above, the treating liquid can be left in the biochar, with the batch being a treated biochar batch ready for packaging, shipment and use in an agricultural or other application. The treating liquid may also be removed through drying, treatment with heated gases, subsequent vacuum processing, centrifugal force (e.g., cyclone drying machines or centrifuges), dilution, or treatment with other liquids, with the batch being a treated biochar batch ready for packaging, shipment and use in an agricultural application. A second, third or more infiltration, removal, infiltration and removal, and combinations and variations of these may also be performed on the biochar with optional drying steps between infiltrations to remove residual liquid from and reintroduce gasses to the pore structure if needed. In any of these stages the liquid may contain organic or inorganic surfactants to assist with the penetration of the treating liquid.

As illustrated in FIG. 5, a system 500 for providing a biochar, preferably having predetermined and generally uniform properties. The system 500 has a vacuum infiltration tank 501. The vacuum infiltration tank 501 has an inlet line 503 that has a valve 504 that seals the inlet line 503. In operation, the starting biochar is added to vacuum infiltration tank 501 as shown by arrow 540. Once the tank is filled with the starting biochar, a vacuum is applied to the tank, by a vacuum pump connected to vacuum line 506, which also has valve 507. The starting biochar is held in the vacuum for a vacuum hold time. Infiltrate, as shown by arrow 548 is added to the tank 501 by line 508 having valve 509. The infiltrate is mixed with the biochar in the tank 501 by agitator 502. The mixing process is done under vacuum for a period of time sufficient to have the infiltrate fill the desired amount of pore volume, e.g., up to 100% of the macropores and mesopores.

Alternatively, the infiltrate may be added to the vacuum infiltration tank 501 before vacuum is pulled on the tank. Optionally, one or more selected gasses may be added to the tank. In this manner, infiltrate is added in the tank in an amount that can be impregnated into the biochar and optionally, the gasses introduced can also potentially impact the reactivity of the liquid as well as any organic or inorganic substances on the surface or in the pore volume of the biochar. As the vacuum is applied, the biochar is circulated in the tank to cause the infiltrate to fill the pore volume. To one skilled in the art, it should be clear that the agitation of the biochar during this process can be performed through various means, such as a rotating tank, rotating agitator, pressure variation in the tank itself, or other means. Additionally, the biochar may be dried using conventional means before even the first treatment. This optional pre-drying can remove liquid from the pores and in some situations may increase the efficiency of impregnation due to pressure changes in the tank.

Pressure is then restored in the tank 501 with either ambient air or a prescribed selection of gasses, and the infiltrated biochar is removed, as shown by arrow 541, from the tank 501 to bin 512, by way of a sealing gate 511 and removal line 510. The infiltrated biochar is collected in bin 512, where it can be further processed in several different ways. The infiltrated biochar can be shipped for use as a treated biochar as shown by arrow 543. The infiltrated biochar can be returned to the tank 501 (or a second infiltration tank). If returned to the tank 501 the biochar can be processed with a second infiltration step, a vacuum drying step, a washing step, or combinations and variations of these. The infiltrated biochar can be moved by conveyor 514, as shown by arrow 542, to a drying apparatus 516, e.g., a centrifugal dryer or heater, where water, infiltrate or other liquid is removed by way of line 517, and the dried biochar leaves the dryer through discharge line 518 as shown by arrow 545, and is collected in bin 519. The biochar is removed from the bin by discharge 520. The biochar may be shipped as a treated biochar for use in an agriculture application, as shown by arrow 547. The biochar may also be further processed, as shown by 546. Thus, the biochar could be returned to tank 501 (or a second vacuum infiltration tank) for a further infiltration step. The drying step may be repeated either by returning the dry biochar to the drying apparatus 516, or by running the biochar through a series of drying apparatus, until the predetermined dryness of the biochar is obtained, e.g., between 50% to less than 1% moisture.

The system 500 is illustrative of the system, equipment and processes that can be used for, and to carry out the present inventions. Various other implementations and types of equipment can be used. The vacuum infiltration tank can be a sealable off-axis rotating vessel, chamber or tank. It can have an internal agitator that also when reversed can move material out, empty it, (e.g., a vessel along the lines of a large cement truck, or ready mix truck, that can mix and move material out of the tank, without requiring the tank's orientation to be changed). Washing equipment may be added or utilized at various points in the process, or may be carried out in the vacuum tank, or drier, (e.g., wash fluid added to biochar as it is placed into the drier for removal). Other steps, such as bagging, weighing, the mixing of the biochar with other materials, e.g., fertilized, peat, soil, etc. can be carried out. In all areas of the system referring to vacuum infiltration, optionally positive pressure can be applied, if needed, to enhance the penetration of the infiltrate or to assist with re-infusion of gaseous vapors into the treated char. Additionally, where feasible, especially in positive pressure environments, the infiltrate may have soluble gasses added which then can assist with removal of liquid from the pores, or gaseous treatment of the pores upon equalization of pressure.

As noted above, the biochar may also be treated using a surfactant. The same or similar equipment used in the vacuum infiltration process can be used in the surfactant treatment process. Although it is not necessary to apply a vacuum in the surfactant treatment process, the vacuum infiltration tank or any other rotating vessel, chamber or tank can be used. In the surfactant treatment process, a surfactant, such as yucca extract, is added to the infiltrate, e.g., acid wash or water. The quantity of the surfactant added to the infiltrate may vary depending upon the surfactant used. For example, organic yucca extract can be added at a rate of between 0.1-20%, but more preferably 1-5% by volume of the infiltrate. The infiltrate with surfactant is then mixed with the biochar in a tumbler for several minutes, e.g., 3-5 minutes, without applied vacuum. Optionally, a vacuum or positive pressure may be applied with the surfactant to improve efficiency and penetration, but is not strictly necessary. Additionally, infiltrate to which the surfactant or detergent is added may be heated or may be ambient temperature or less. Similarly, the mixture of the surfactant or detergent, as well as the char being treated may be heated, or may be ambient temperature, or less. After tumbling, excess free liquid can be removed in the same manner as described above in connection with the vacuum infiltration process. Drying, also as described above in connection with the vacuum infiltration process, is an optional additional step. Besides yucca extract, a number of other surfactants may be used for surfactant treatment, which include, but are not limited to, the following: nonionic types, such as, ethoxylated alcohols, phenols-lauryl alcohol ethoxylates, Fatty acid esters—sorbitan, tween 20, amines, amides-imidazoles; anionic types, such as sulfonates-arylalkyl sulfonates and sulfate—sodium dodecyl sulfate; cationic types, such as alkyl—amines or ammoniums—quaternary ammoniums; and amphoteric types, such as betaines—cocamidopropyl betaine. Additionally biosurfactants, or microbes which produce biosurfactants such as *Flavobacterium* sp. may also be used.

Optionally, the biochar may also be treated by applying ultrasonics. In this treatment process, the biochar may be contacted with a treating liquid that is agitated by ultrasonic waves. By agitating the treating liquid, contaminants may be dislodged or removed from the biochar due to bulk motion of the fluid in and around the biocarbon, pressure changes, including cavitation in and around contaminants on the surface, as well as pressure changes in or near pore openings (cavitation bubbles) and internal pore cavitation.

In this manner, agitation will cause contaminants of many forms to be released from the internal and external structure of the biochar. The agitation also encourages the exchange of water, gas, and other liquids with the internal biochar structure. Contaminants are transported from the internal structure to the bulk liquid (treating fluid) resulting in biochar with improved physical and chemical properties. The effectiveness of ultrasonic cleaning is tunable as bubble size and number is a function of frequency and power delivered by the transducer to the treating fluid In one example, applying ultrasonic treatment, raw wood based biochar between 10 microns to 10 mm with moisture content from 0% to 90% may be mixed with a dilute mixture of acid and water (together the treating liquid) in a processing vessel that also translates the slurry (the biochar/treating liquid mixture). During translation, the slurry passes near an ultrasonic transducer to enhance the interaction between the fluid and biochar. The biochar may experience one or multiple washes of dilute acid, water, or other treating fluids. The biochar may also make multiple passes by ultrasonic transducers to enhance physical and chemical properties of the biochar. For example, once a large volume of slurry is made, it can continuously pass an ultrasonic device and be degassed and wetted to its maximum, at a rapid processing rate. The slurry can also undergo a separation process in which the fluid and solid biochar are separated at 60% effectiveness or greater.

Through ultrasonic treatment, the pH of the biochar, or other physical and chemical properties may be adjusted and the mesopore and macropore surfaces of the biochar may be cleaned and enhanced. Further, ultrasonic treatment can be used in combination with bulk mixing with water, solvents, additives (fertilizers, etc.), and other liquid based chemicals to enhance the properties of the biochar. After treatment, the biochar may be subject to moisture adjustment, further treatment and/or inoculation using any of the methods set forth above. In certain applications, ultrasonic technology may also be used to modify (usually reduce) the size of the biochar particles while retaining much, most, or nearly all of the porosity and pore structure. This yields smaller size particles with different morphologies than other methods of sizing such as grinding, crushing, sieving, or shaking.

C. Impact of Treatment

As illustrated above, the treatment process, whether using pressure changes (e.g. vacuum), surfactant or ultrasonic treatment, or a combination thereof, may include two steps, which in certain applications, may be combined: (i) washing and (ii) inoculation of the pores with an additive. When the desired additive is the same and that being inoculated into the pores, e.g., water, the step of washing the pores and inoculating the pores with an additive may be combined.

While not exclusive, washing is generally done for one of three purposes: (i) to modify the surface of the pore structure of the biochar (i.e., to allow for increased retention of liquids); (ii) to modify the pH of the biochar; and/or (iii) to remove undesired and potentially harmful compounds or gases.

Testing has further demonstrated that if the biochar is treated, at least partially, in a manner that causes the infusion and/or effusion of liquids and/or vapors into and/or out of the biochar pores (through mechanical, physical, biological, or chemical means), certain beneficial properties of the biochar can be altered, enhanced or improved through treatment. By knowing the properties of the raw biochar and the optimal desired properties of the treated biochar, the raw biochar can then be treated in a manner that results in the treated biochar having controlled optimized properties and greater levels of consistency between batches as well as between treated biochars arising from various feedstocks.

Using the treatment processes described above, or other treatments that provide, in part, for the infusion and/or effusion of liquids and/or vapors into and/or out of the biochar pores, biochars can have improved physical and chemical properties over raw biochar.

1. Water Holding/Retention Capacity

As demonstrated below, the treatment processes of the invention modify the surfaces of the pore structure to provide enhanced functionality and to control the properties of the biochar to achieve consistent and predicable performance. Using the above treatment processes, anywhere from at least 10% of the total pore surface area up to 90% or more of the total pore surface area may be modified. In some implementations, it may be possible to achieve modification of up to 99% or more of the total pore surface area of the biochar particle. Using the processes set forth above, such modification may be substantially and uniformly achieved for an entire batch of treated biochar.

For example, it is believed that by treating the biochar as set forth above, the hydrophilicity of the surface of the pores of the biochar is modified, allowing for a greater water retention capacity, as well as, perhaps more importantly, more effective association of water loving biology (such as plant root tissue and other microbial life) with the material. Further, by treating the biochars as set forth above, gases and other substances are also removed from the pores of the biochar particles, also contributing to the biochar particles' increased water holding capacity. Thus, the ability of the biochar to retain liquids, whether water or additives in solution, is increased, which also increases the ability to load the biochar particles with large volumes of inoculant, infiltrates and/or additives.

A batch of biochar has a bulk density, which is defined as weight in grams (g) per $cm^3$ of loosely poured material that has or retains some free space between the particles. The biochar particles in this batch will also have a solid density, which is the weight in grams (g) per $cm^3$ of just particles, i.e., with the free space between the particles removed. The solid density includes the air space or free space that is contained within the pores, but not the free space between particles. The actual density of the particles is the density of the material in grams (g) per $cm^3$ of material, which makes up the biochar particles, i.e., the solid material with pore volume removed.

In general, as bulk density increases the pore volume would be expected to decrease and, if the pore volume is macro or mesoporous, with it, the ability of the material to hold infiltrate, e.g., inoculant. Thus, with the infiltration processes, the treated biochars can have impregnation capacities that are larger than could be obtained without infiltration, e.g., the treated biochars can readily have 10%, 30%, 40%, 50%, or most preferably, 60%-100% of their total pore volume filled with an infiltrate, e.g., an inoculant. The impregnation capacity is the amount of a liquid that a biochar particle, or batch of particles, can absorb. The ability to make the pores surface hydrophilic, and to infuse liquid deep into the pore structure through the application of positive or negative pressure and/or a surfactant, alone or in combination, provides the ability to obtain these high impregnation capabilities. The treated biochars can have impregnation capacities, i.e., the amount of infiltrate that a particle can hold on a volume held/total volume of a particle basis, that is greater than $0.2\ cm^3/cm^3$ to $0.8\ cm^3/cm^3$.

Figure 6:
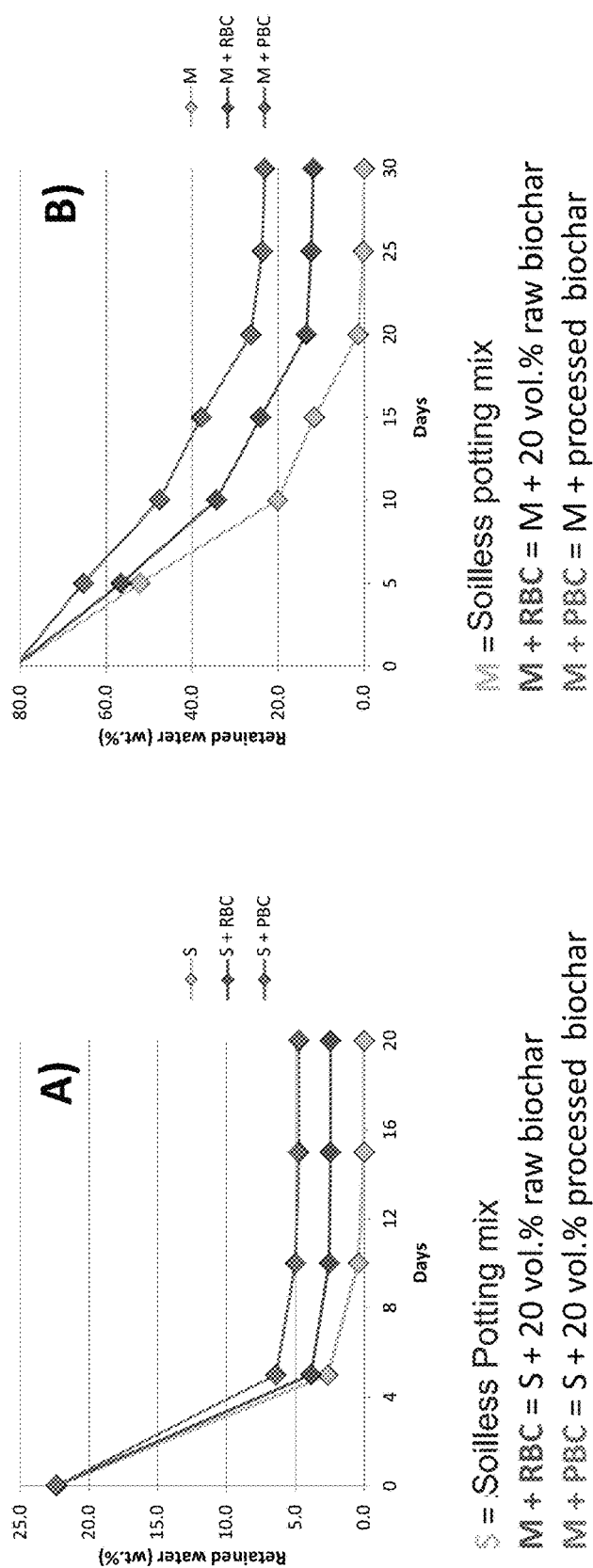
FIG. 6 is a chart showing the water holding capacities of treated biochar as compared to raw biochar and sandy clay loam soil and as compared to raw biochar and soilless potting soil.

Accordingly, by using the treatment above, the water retention capacity of biochar can be greatly increased over the water retention capacities of various soil types and even raw biochar, thereby holding water and/or nutrients in the plant's root zone longer and ultimately reducing the amount of applied water (through irrigation, rainfall, or other means) needed by up to 50% or more. FIG. 6 has two charts showing the water retention capacities of planting substrates versus when mixed with raw and treated biochar. In this example, the raw and treated biochar are derived from coconut biomass. The soils sampled are loam and sandy clay soil and a common commercial horticultural peat and perlite soilless potting mix. The charts show the retained water as a function of time.

In chart A of FIG. 6, the bottom line represents the retained water in the sandy claim loam soil over time. The middle line represents the retained water in the sandy clay soil with 20% by volume percent of unprocessed raw biochar. The top line represents the retained water in the sandy clay loam soil with 20% by volume percent of treated biochar (adjusted and inoculated biochar). Chart B of FIG. 6 represents the same using peat and perlite soilless potting mix rather than sandy clay loam soil.

Figure 7:
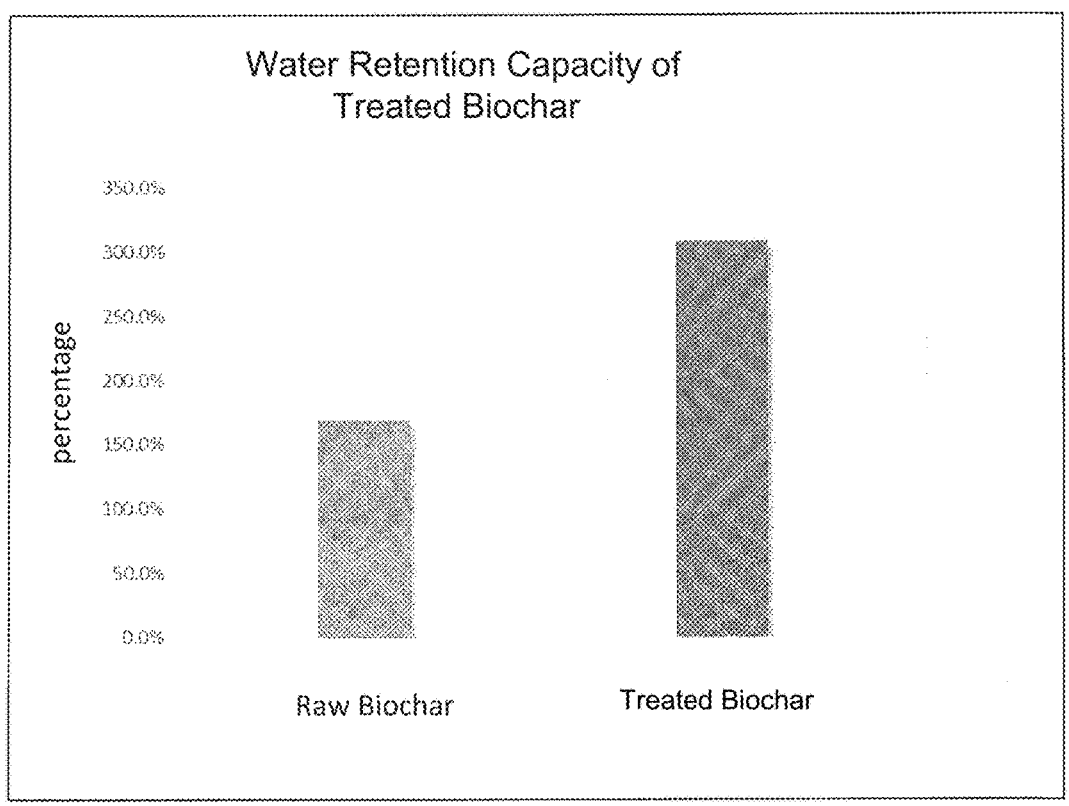
FIG. 7 illustrates the different water retention capacities of raw biochar versus treated biochar measured gravimetrically.

As illustrated in FIG. 7 the treated biochar has an increased water retention capacity over raw biochar of approximately 1.5 times the raw biochar. Similarly, testing of treated biochar derived from pine have also shown an approximate 1.5 times increase in water retention capacity over raw biochar. With certain biochar, the water retention capacity of treated biochar could be as great as three time that of raw biochar.

"Water holding capacity," which may also be referred to as "Water Retention Capacity," is the amount of water that can be held both internally within the porous structure and in the interparticle void spaces in a given batch of particles. While a summary of the method of measure is provided above, a more specific method of measuring water holding capacity/water retention capacity is measured by the following procedure: (i) drying a sample of material under temperatures of 105° C. for a period of 24 hours or using another scientifically acceptable technique to reduce the moisture content of the material to less than 2%, less than 1%; and preferably less than 0.5% (ii) placing a measured amount of dry material in a container; (iii) filling the container having the measured amount of material with water such that the material is completely immersed in the water; (iv) letting the water remain in the container having the measured amount of material for at least ten minutes or treating the material in accordance with the invention by infusing with water when the material is a treated biochar; (v) draining the water from the container until the water ceases to drain; (vi) weighing the material in the container (i.e., wet weight); (vii) again drying the material by heating it under temperatures of 105° C. for a period of 24 hours or using another scientifically acceptable technique to reduce the moisture content of the material to less than 2% and preferably less than 1%; and (viii) weighing the dry material again (i.e., dry weight) and, for purposes of a volumetric measure, determining the volume of the material.

Measured gravimetrically, the water holding/water retention capacity is determined by measuring the difference in weight of the material from step (vi) to step (viii) over the weight of the material from step (viii) (i.e., wet weight-dry weight/dry weight). FIG. 7 illustrates the different water retention capacities of raw biochar versus treated biochar measured gravimetrically. As illustrated, water retention capacity of raw biochar can be less than 200%, whereas treated biochar can have water retention capacities measured gravimetrically greater than 100%, and preferably between 200 and 400%.

Water holding capacity can also be measured volumetrically and represented as a percent of the volume of water retained in the biochar after gravitationally draining the excess water/volume of biochar The volume of water retained in the biochar after draining the water can be determined from the difference between the water added to the container and water drained off the container or from the difference in the weight of the wet biochar from the weight of the dry biochar converted to a volumetric measurement. This percentage water holding capacity for treated biochar may be 30% and above by volume, and preferably 50-55 percent and above by volume.

Given biochar's increased water retention capacity, the application of the treated biochar and even the raw biochar can greatly assist with the reduction of water and/or nutrient application. It has been discovered that these same benefits can be imparted to agricultural growth.

2. Plant Available Water

Figure 8:
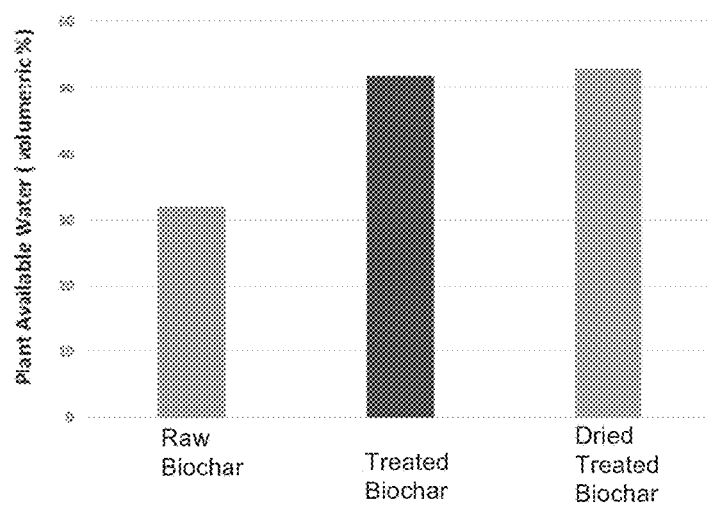
FIG. 8 is a chart showing the plant available water of raw biochar compared to treated biochar (wet and dry).

As illustrated in FIG. 8, plant available water is greatly increased in treated biochar over that of raw biochar. FIG. 8 illustrates the plant available water in raw biochar, versus treated biochar and treated dried biochar and illustrates that treated biochar can have a plant available water percent of greater than 35% by volume.

"Plant Available Water" is the amount of unbound water in the material available for plants to uptake. This is calculated by subtracting the water content at permanent wilting point from the water content at field capacity, which is the point when no water is available for the plants. Field capacity is generally expressed as the bulk water content retained at −33 J/kg (or −0.33 bar) of hydraulic head or suction pressure. Permanent wilting point is generally expressed as the bulk water content retained at −1500 J/kg (or −15.0 bar) of hydraulic head or suction pressure. Methods for measuring plant available water are well-known in the industry and use pressure plate extractor, which are commercially available or can be built using well-known principles of operation.

3. Remaining Water Content

Treated biochar of the present invention has also demonstrated the ability to retain more water than raw biochar after exposure to the environment for defined periods of time. For purposes of this application "remaining water content" can be defined as the total amount of water that remains held by the biochar after exposure to the environment for certain amount of time. Exposure to environment is exposure at ambient temperature and pressures. Under this definition, remaining water content can be may be measured by (i) creating a sample of biochar that has reached its maximum water holding capacity; (ii) determining the total water content by thermogravimetric analysis (H2O (TGA)), as described above on a sample removed from the output of step (i) above, (iii) exposing the biochar in the remaining sample to the environment for a period of 2 weeks (15 days, 360 hrs.); (iv) determining the remaining water content by thermogravimetric analysis (H2O (TGA)); and (v) normalizing the remaining (retained) water in mL to 1 kg or 1 L biochar. The percentage of water remaining after exposure for this two-week period can be calculated by the remaining water content of the biochar after the predetermine period over the water content of the biochar at the commencement of the two-week period. Using this test, treated biochar has shown to retain water at rates over 4× that of raw biochar. Testing has further demonstrated that the following amount of water can remain in treated biochar after two weeks of exposure to the environment: 100-650 mL/kg; 45-150 mL/L; 12-30 gal/ton; 3-10 gal/yd3 after 360 hours (15 days) of exposure to the environment. In this manner, and as illustrated in FIG. 12, biochar treated through vacuum impregnation can increase the amount of retained water in biochar about 3× compared to other methods even after seven weeks. In general, the more porous and the higher the surface area of a given material, the higher the water retention capacity. Further, it is theorized that by modifying the hydrophilicity/hydrophobicity of the pore surfaces, greater water holding capacity and controlled release may be obtained. Thus, viewed as a weight percent, e.g., the weight of retained water to weight of biochar, examples of the present biochars can retain more than 5% of their weight, more than 10% of their weight, and more than 15% of their weight, and more compared to an average soil which may retain 2% or less, or between 100-600 ml/kg by weight of biochar Tests have also shown that treated biochars that show weight loss of >1% in the interval between 43-60° C. when analyzed by the Thermal Gravimetric Analysis (TGA) (as described below) demonstrate greater water holding and content capacities over raw biochars. Weight loss of >5%-15% in the interval between 38-68° C. when analyzed by the Thermal Gravimetric Analysis (TGA) using sequences of time and temperature disclosed in the following paragraphs or others may also be realized. Weight percentage ranges may vary from between >1%-15% in temperature ranges between 38-68° C., or subsets thereof, to distinguish between treated biochar and raw biochar.

Figure 9:
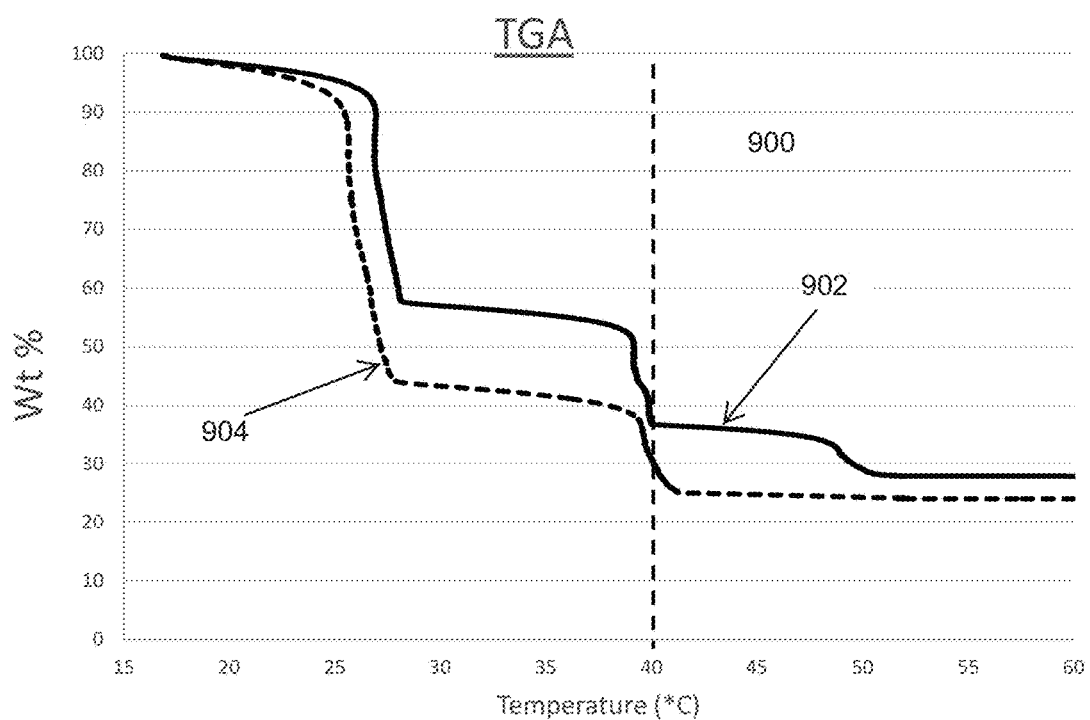
FIG. 9 is a chart showing the weight loss of treated biochars verses raw biochar samples when heated at varying temperatures using a TGA testing method.

FIG. 9 is a chart 900 showing the weight loss of treated biochars 902 verses raw biochar samples 904 when heated at varying temperatures using the TGA testing described below. As illustrated, the treated biochars 902 continue to exhibit weight loss when heated between 40-60° C. when analyzed by the Thermal Gravimetric Analysis (TGA) (described below), whereas the weight loss in raw biochar 904 between the same temperature ranges levels off. Thus, testing demonstrates the presence of additional moisture content in treated biochars 902 versus raw biochars 904.

In particular, the treated biochars 902 exhibit substantial water loss when heated in inert gas such as nitrogen. More particularly, when heated for 25 minutes at each of the following temperatures 20, 30, 40, 50 and 60 degrees Celsius, ° C. the treated samples lose about 5-% to 15% in the interval 43-60° C. and upward of 20-30% in the interval between 38-68° C. The samples to determine the water content of the raw biochar were obtained by mixing a measured amount of biochar and water, stirring the biochar and water for 2 minutes, draining off the water, measuring moisture content and then subjecting the sample to TGA. The samples for the treated biochar were obtained by using the same measured amount of biochar as used in the raw biochar sample, and impregnating the biochar under vacuum. Similar results are expected with biochar treated with a treatment process consistent with those described in this disclosure with the same amount of water as used with the raw biochar. The moisture content is then measured and the sample is subjected to TGA described above.

The sequences of time and temperature conditions for evaluating the effect of biochars heating in inert atmosphere is defined in this application as the "Bontchev-Cheyne Test" ("BCT"). The BCT is run using samples obtained, as described above, and applying Thermal Gravimetric Analysis (TGA) carried out using a Hitachi STA 7200 analyzer under nitrogen flow at the rate of 110 mL/min. The biochar samples are heated for 25 minutes at each of the following temperatures: 20, 30, 40, 50 and 60° C. The sample weights are measured at the end of each dwell step, at the beginning and at the end of the experiment. The analyzer also continually measures and records weight over time. Biochars having enhanced water holding or retention capacities are those that exhibit weight loss of >5% in the interval between 38-68° C., >1% in the interval between 43-60° C. Biochars with greater water holding or retention capacities can exhibit >5% weight loss in the interval between 43-60° C. measured using the above described BCT.

D. Impregnation and/or Inoculation with Infiltrates or Additives

In addition to mitigating or removing deleterious pore surface properties, by treating the pores of the biochar through a forced, assisted, accelerate or rapid infiltration process, such as those described above, the pore surface properties of the biochar can be enhanced. Such treatment processes may also permit subsequent processing, may modify the pore surface to provide predetermined properties to the biochar, and/or provide combinations and variations of these effects. For example, it may be desirable or otherwise advantageous to coat substantially all, or all of the biochar macropore and mesopore surfaces with a surface modifying agent or treatment to provide a predetermined feature to the biochar, e.g., surface charge and charge density, surface species and distribution, targeted nutrient addition, magnetic modifications, root growth facilitator, and water absorptivity and water retention properties.

By infusing liquids into the pores of biochar, it has been discovered that additives infused within the pores of the biochar provide a time release effect or steady flow of some beneficial substances to the root zones of the plants and also can improve and provide a more beneficial environment for microbes which may reside or take up residence within the pores of the biochar. In particular, additive infused biochars placed in the soil prior to or after planting can dramatically reduce the need for high frequency application of additives, minimize losses caused by leaching and runoff and/or reduce or eliminate the need for controlled release fertilizers. They can also be exceptionally beneficial in animal feed applications by providing an effective delivery mechanism for beneficial nutrients, pharmaceuticals, enzymes, microbes, or other substances.

For purposes of this application, "infusion" of a liquid or liquid solution into the pores of the biochar means the introduction of the liquid or liquid solution into the pores of the biochar by a means other than solely contacting the liquid or solution with the biochar, e.g., submersion. The infusion process, as described in this application in connection with the present invention, includes a mechanical, chemical or physical process that facilitates or assist with the penetration of liquid or solution into the pores of the biochar, which process may include, but not be limited to, positive and negative pressure changes, such as vacuum infusion, surfactant infusion, or infusion by movement of the liquid and/or biochar (e.g., centrifugal force, steam and/or ultrasonic waves) or other method that facilitates, assists, forces or accelerates the liquid or solution into the pores of the biochar. Prior to infusing the biochar, the biochar, as described in detail above, may be washed and/or moisture adjusted.

Figure 10:
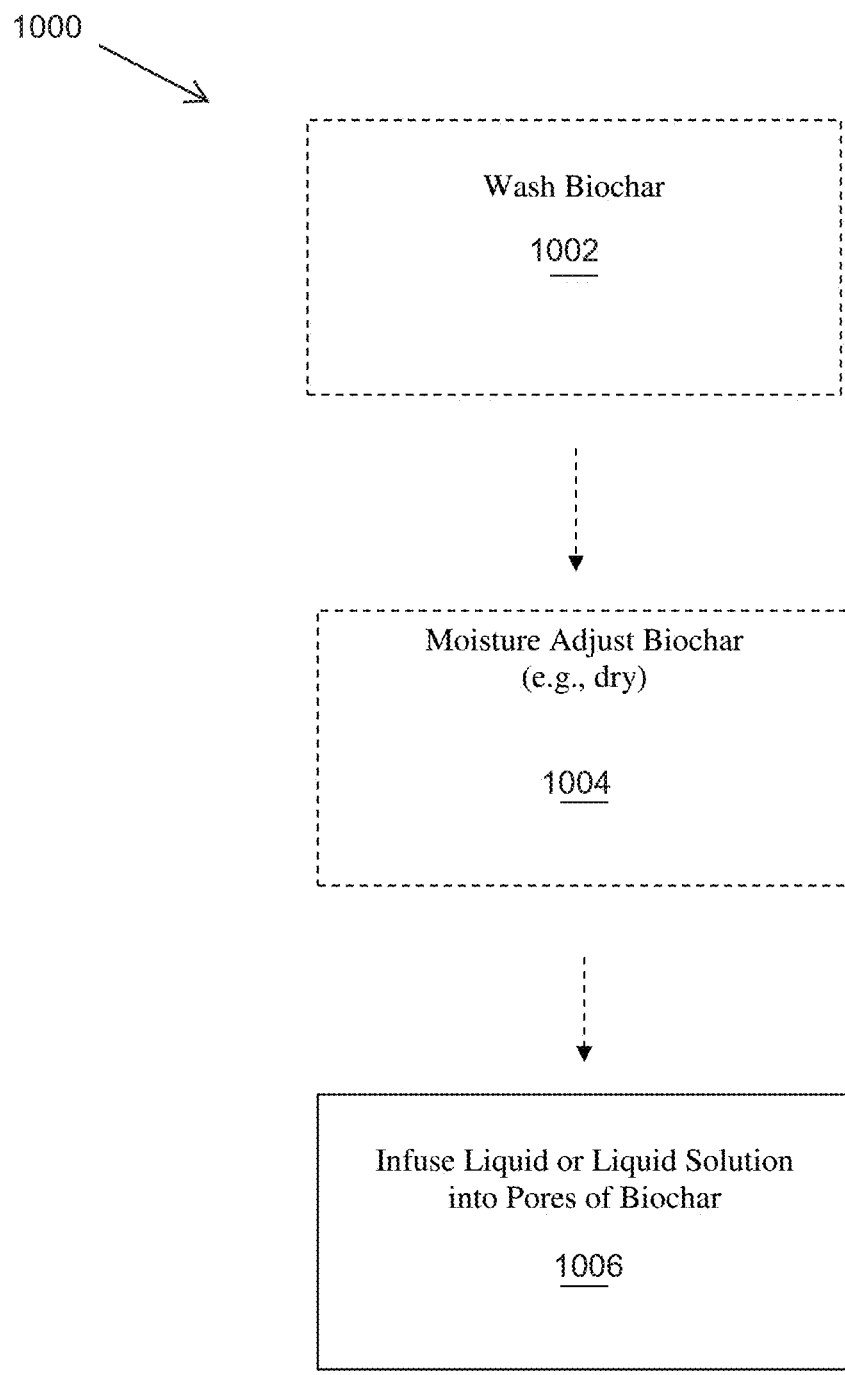
FIG. 10 is a flow diagram showing one example of a method for infusing biochar.

FIG. 10 is a flow diagram 1000 of one example of a method for infusing biochar with an additive. Optionally, the biochar may first be washed or treated at step 1002, the wash may adjust the pH of the biochar, as described in more detail above, or may be used to remove elemental ash and other harmful organics that may be unsuitable for the desired infused fertilizer. Optionally, the moisture content of the biochar may then be adjusted by drying the biochar at step 1004, also as described in further detail above, prior to infusion of the additive or inoculant at step 1006.

In summary, the infusion process may be performed with or without any washing, prior pH adjustment or moisture content adjustment. Optionally, the infusion process may be performed with the wash and/or the moisture adjustment step. All the processes may be completed alone or in the conjunction with one or more of the others.

Through the above process of infusing the additive into the pores of the biochar, the pores of the biochar may be filled by 25%, up to 100%, with an additive solution, as compared to 1-20% when the biochar is only submerged in the solution or washed with the solution for a period of less than twelve hours. Higher percentages may be achieved by washing and/or drying the pores of the biochar prior to infusion.

Data have been gathered from research conducted comparing the results of soaking or immersion of biochar in liquid versus vacuum impregnation of liquid into biochar. These data support the conclusion that vacuum impregnation provides greater benefits than simple soaking and results in a higher percentage volume of moisture on the surface, interstitially and in the pores of the biochar.

Figure 11:
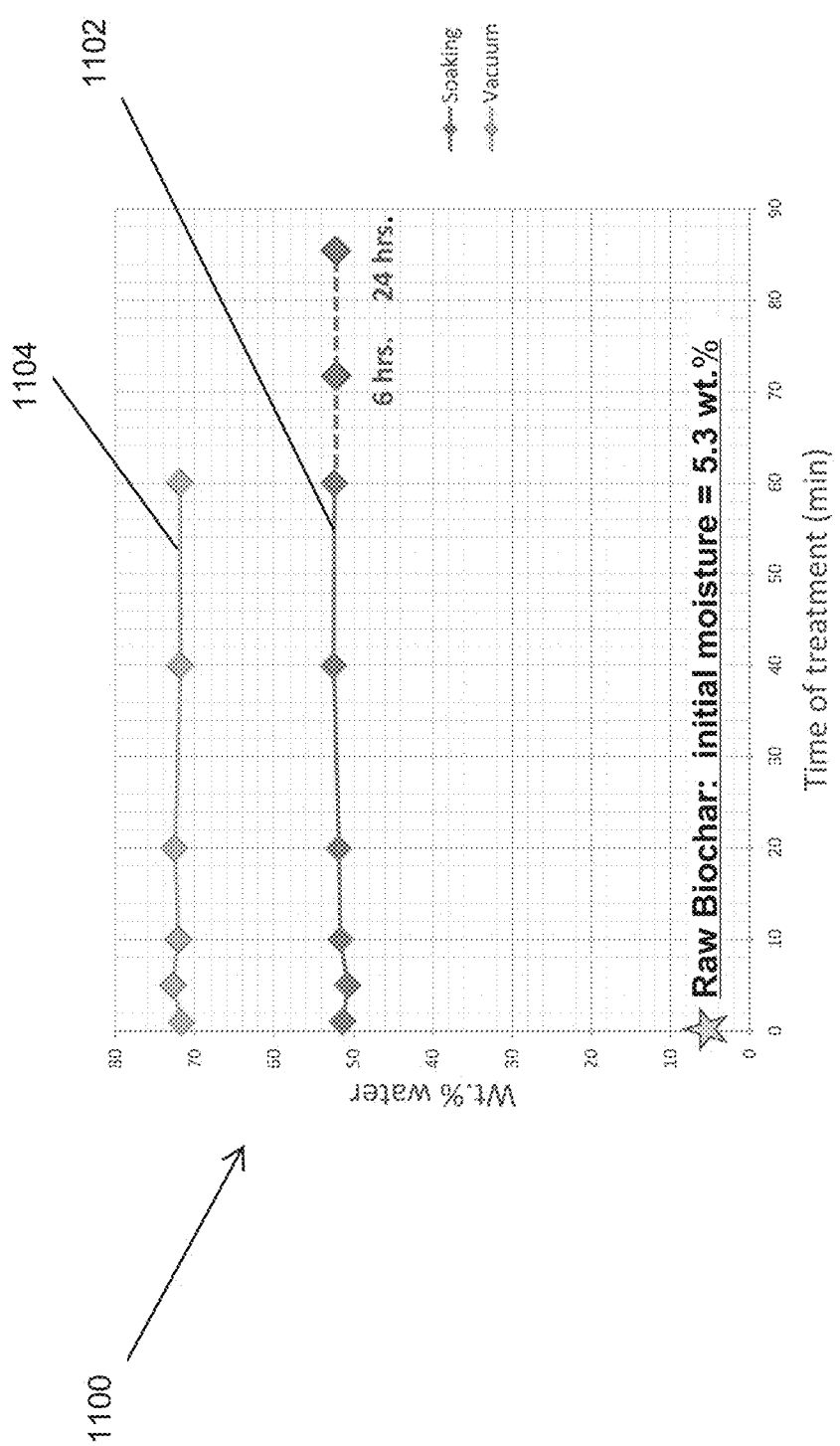
FIG. 11 illustrates the improved liquid content of biochar using vacuum impregnation as against soaking the biochar in liquid.

In one experiment, equal quantities of pine biochar were mixed with equal quantities of water, the first in a beaker, the second in a vacuum flask. The mixture in the beaker was continuously stirred for up to 24 hours, then samples of the suspended solid were taken, drained and analyzed for moisture content. The mixture in the vacuum flask was connected to a vacuum pump and negative pressure of 15" was applied. Samples of the treated solid were taken, drained and analyzed for moisture content. FIG. 11 is a chart illustrating the results of the experiment. The lower graph 1102 of the chart, which shows the results of soaking over time, shows a wt. % of water of approximately 52%. The upper graph 1104 of the chart, which shows the results of vacuum impregnation over time, shows a wt. % of water of approximately 72%.

Figures 12A, 12B:
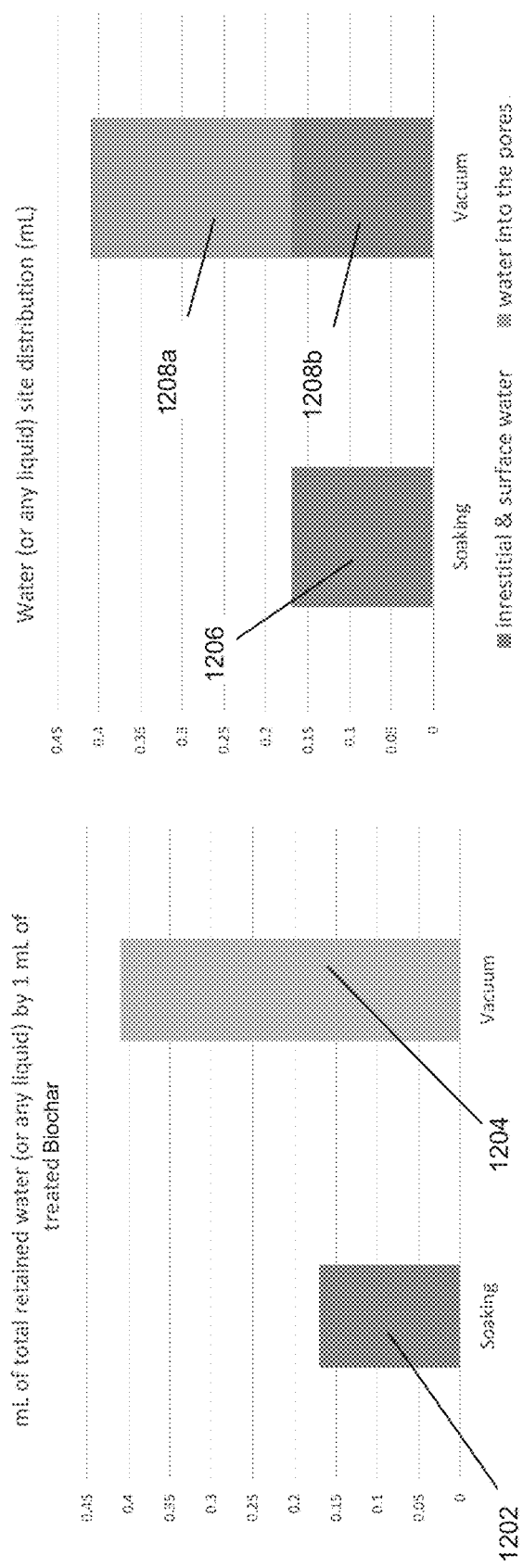
FIG. 12a is a chart comparing total retained water of treated biochar after soaking and after vacuum impregnation.
FIG. 12b is a chart comparing water on the surface, interstitially and in the pores of biochar after soaking and after vacuum impregnation.

FIGS. 12a and 12b show two charts that further illustrate that the total water and/or any other liquid content in processed biochar can be significantly increased using vacuum impregnation instead of soaking. FIG. 12a compares the mL of total water or other liquid by retained by 1 mL of treated pine biochar. The graph 1202 shows that approximately 0.17 mL of water or other liquid are retained through soaking, while the graph 1204 shows that approximately 0.42 mL of water or other liquid are retained as a result of vacuum impregnation. FIG. 12b shows that the retained water of pine biochar subjected to soaking consists entirely of surface and interstitial water 1206, while the retained water of pine biochar subjected to vacuum impregnation consists not only of surface and interstitial water 1208a, but also water impregnated in the pores of the biochar 1208b.

Figure 13:
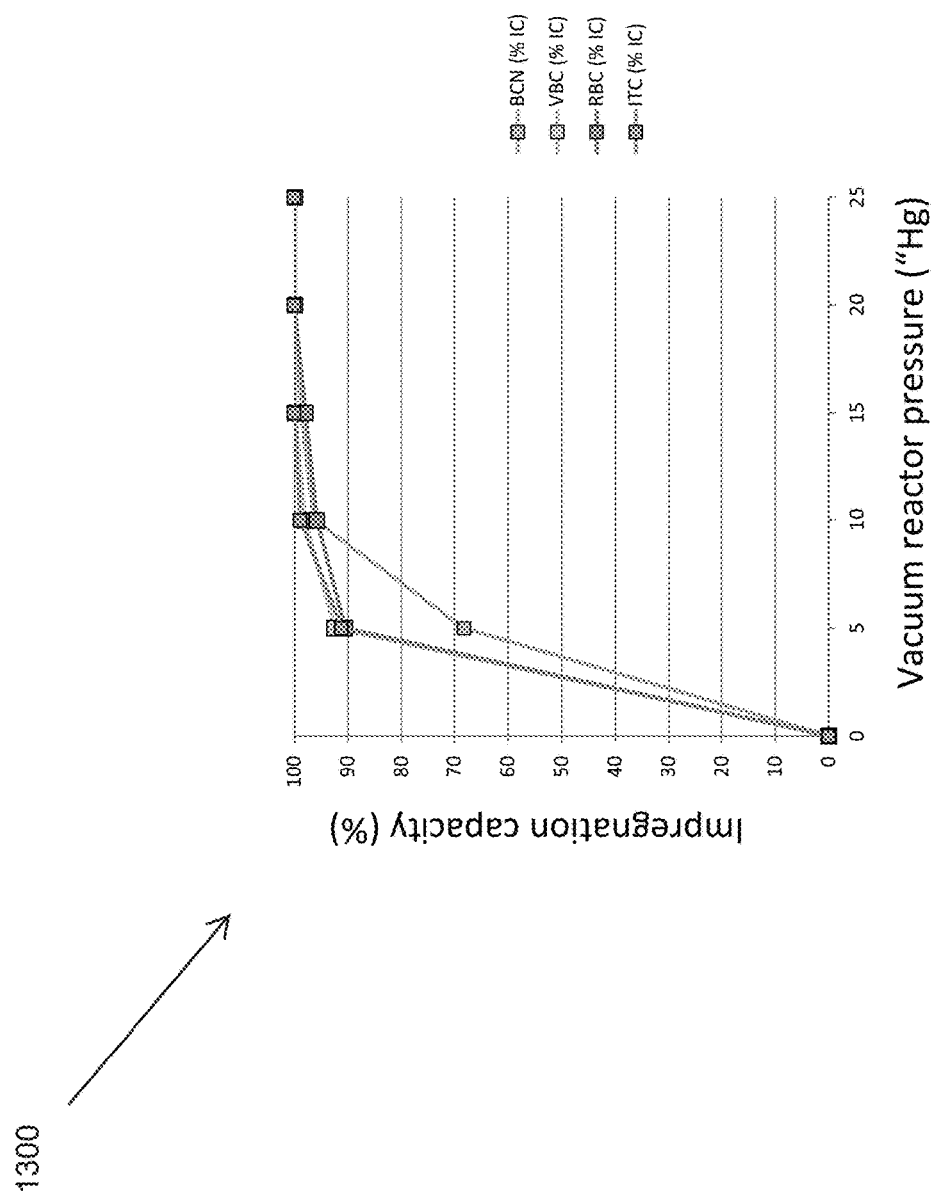
FIG. 13 illustrates how the amount of water or other liquid in the pores of vacuum processed biochars can be increased varied based upon the applied pressure.

In addition, as illustrated by FIG. 13, the amount of moisture content impregnated into the pores of vacuum processed biochars by varying the applied (negative) pressure during the treatment process. The graphs of four different biochars all show how the liquid content of the pours of each of them increase to 100% as vacuum reactor pressure is increased.

In another experiment, the percentage of water retained in the pores of pine derived biochar was measured to determine the difference in retained water in the pores of the biochar (i) soaked in water, and (ii) mixed with water subjected to a partial vacuum. For the soaking, 250 mL of raw biochar was mixed with 500 mL water in a beaker. Upon continuous stirring for 24 hrs., aliquots of the suspended solid were taken, drained on a paper towel and analyzed for moisture content. For the vacuum, 250 mL of raw biochar was mixed with 500 mL water in a vacuum flask. The flask was connected to a vacuum pump and negative pressure of 15" has been applied, aliquots of the treated solid were taken, drained on a paper towel and analyzed for moisture content.

The total retained water amounts were measured for each sample. For the soaked biochar, the moisture content of biochar remains virtually constant for the entire duration of the experiment, 52 wt. % (i.e. 1 g of "soaked biochar" contains 0.52 g water and 0.48 g "dry biochar"). Taking into account the density of raw biochar, 0.16 g/cm$^3$ (or mL), the volume of the 0.48 g "dry biochar" is 3.00 mL (i.e. 3 mL dry biochar can "soak" and retain 0.52 mL water, or 1 mL dry biochar can retain 0.17 mL water (sorbed on the surface and into the pores)).

For vacuum, the moisture content of the biochar remains virtually constant for the entire duration of the experiment, 72 wt. %, (i.e. 1 g of vacuum impregnated biochar contains 0.72 g water and 0.28 g "dry biochar"). Taking into account the density of raw biochar, 0.16 g/cm$^3$ (or mL), the volume of the 0.28 g "dry biochar" is 1.75 mL (i.e. 1.75 mL dry biochar under vacuum can "absorb" and retain 0.72 mL water, or 1 mL dry biochar can retain 0.41 mL water (sorbed on the surface and into the pores)).

It was next determined where the water was retained—in the pores or on the surface of the biochar. Capillary porosity ("CP") (vol % inside the pores of the biochar), non-capillary porosity ("NCP") (vol. % outside/between the particles), and the total porosity (CP+NCP)) were determined. Total porosity and non-capillary porosity were analytically determined for the dry biochar and then capillary porosity was calculated.

Since the dry biochar used in this experiment had a density less than water, the particles could be modeled and then tested to determine if soaking and/or treating the biochar could infuse enough water to make the density of the biochar greater than that of water. Thus, the dry biochar would float and, if enough water infused into the pores, the soaked or treated biochar would sink. Knowing the density of water and the density of the biochar, calculations were done to determine the percentage of pores that needed to be filled with water to make the biochar sink. In this specific experiment, these calculations determined that more than 24% of the pore volume would need to be filled with water for the biochar to sink. The two processed biochars, soaked and vacuum treated, were then immersed in water after 1 hour of said processing. The results of the experiment showed that the vast majority of the soaked biochar floated and remained floating after 3 weeks, while the vast majority of the vacuum treated biochar sank and remained at the bottom of the water column after 3 weeks.

Using the results of these experiments and model calculations, the biochar particles can be idealized to estimate how much more water is in the pores from the vacuum treatment versus soaking. Since the external surface of the materials are the same, it was assumed that the samples retain about the same amount of water on the surface. Then the most conservative assumption was made using the boundary condition for particles to be just neutral, i.e. water into pores equal 24%, the water distribution is estimated as follows:

| | DRY BIOCHAR | SOAKED BIOCHAR | VACUUM TREATED BIOCHAR |
|---|---|---|---|
| Experimental result | FLOATED | FLOATED | SANK |
| Total water (determined in first part of experiment) | 0% | 52% | 72% |
| Water in the pores (assumed for floating biochar to be boundary condition, calculated for biochar that sank) | 0% | 24% | 44% |
| Water on the surface (calculated for floating biochar, assumed to match floating biochar for the biochar that sank) | 0% | 28% | 28% |

In summary, these experimental tests and model calculations show that through vacuum treatment more than 24% of the pores of the biochar can be filled with water and in fact at least 1.8 times the amount of water can be infused into the pores compared to soaking. Vacuum treatment can impregnate almost two times the amount of water into the pores for 1 minute, while soaking does not change the water amount into the pores for three weeks.

The pores may be substantially filled or completely filled with additives to provide enhanced performance features to the biochar, such as increased plant growth, nutrient delivery, water retention, nutrient retention, disadvantageous species control, e.g., weeds, disease causing bacteria, insects, volunteer crops, etc. By infusing liquid into the pore structure through the application of positive or negative pressure, surfactant and/or ultrasonic waves, alone or in combination, provides the ability to impregnate the mesopores and macropores of the biochar with additives, that include, but are not limited to, soil enhancing solutions and solids.

The additive may be a soil enhancing agent that includes, but is not be limited to, any of the following: water, water solutions of salts, inorganic and organic liquids of different polarities, liquid organic compounds or combinations of organic compounds and solvents, mineral and organic oils, slurries and suspensions, supercritical liquids, fertilizers, PGPB (including plant growth promoting rhizobacteria, free-living and nodule-forming nitrogen fixing bacteria, organic decomposers, nitrifying bacteria, and phosphate solubilizing bacteria), biocontrol agents, bioremediation agents, saprotrophic fungi, ectomycorrhizae and endomycorrhizae, among others.

Fertilizers that may be infused into the biochar include, but are not limited to, the following sources of nitrogen, phosphorous, and potassium: urea, ammonium nitrate, calcium nitrate, sulfur, ammonium sulfate, monoammonium phosphate, ammonium polyphosphate, potassium sulfate, or potassium chloride.

Similar beneficial results are expected from other additives, such as: bio pesticides; herbicides; insecticides; nematicides; plant hormones; plant pheromones; organic or inorganic fungicides; algicides; antifouling agents; antimicrobials; attractants; biocides, disinfectants and sanitizers; miticides; microbial pesticides; molluscicides; bacteriacides; fumigants; ovicides; repellents; rodenticides, defoliants, desiccants; insect growth regulators; plant growth regulators; beneficial microbes; and, microbial nutrients or secondary signal activators, that may also be added to the biochar in a similar manner as a fertilizer. Additionally, beneficial macro- and micro-nutrients such as, calcium, magnesium, sulfur, boron, zinc, iron, manganese, molybdenum, copper and chloride may also be infused into the biochar in the form of a water solution or other solvent solution.

Examples of compounds, in addition to fertilizer, that may be infused into the pores of the biochar include, but are not limited to: phytohormones, such as, abscisic acid (ABA), auxins, cytokinins, gibberellins, brassinosteroies, salicylic acid, jasmonates, planet peptide hormones, polyamines, karrikins, strigolactones; 2,1,3-Benzothiadiazole (BTH), an inducer of systemic acquired resistance that confers broad spectrum disease resistance (including soil borne pathogens); signaling agents similar to BTH in mechanism or structure that protects against a broad range or specific plant pathogens; EPSPS inhibitors; synthetic auxins; photosystem I inhibitors photosystem II inhibitors; and HPPD inhibitors. Growth media, broths, or other nutrition to support the growth of microbes or microbial life may also be infused such as Lauryl Tryptose broth, glucose, sucrose, fructose, or other sugars or micronutrients known to be beneficial to microbes. Binders or binding solutions can also be infused into the pores to aid in the adhesion of coatings, as well as increasing the ability for the treated biochar to associate or bond with other nearby particles in seed coating applications. Infusion with these binders can also allow for the coating of the biochar particle itself with other beneficial organisms or substances.

In one example, a 1000 ppm $NO_3^-$ N fertilizer solution is infused into the pores of the biochar. As discussed above, the method to infuse biochar with the fertilizer solution may be accomplished generally by placing the biochar in a vacuum infiltration tank or other sealable rotating vessel, chamber or tank. When using vacuum infiltration, a vacuum may be applied to the biochar and then the solution may be introduced into the tank. Alternatively, the solution and biochar may both be introduced into the tank and, once introduced, a vacuum is applied. Based upon the determined total pore volume of the biochar or the incipient wetness, the amount of solution to introduce into the tank necessary to fill the pore of the biochar can be determined. When infused in this manner, significantly more nutrients can be held in a given quantity of biochar versus direct contact of the biochar with the nutrients alone.

When using a surfactant, the biochar and additive solution may be added to a tank along with 0.01-20% of surfactant, but more preferably 1-5% of surfactant by volume of fertilizer solution. The surfactant or detergent aids in the penetration of the wash solution into the pores of the biochar. The same or similar equipment used in the vacuum infiltration process can be used in the surfactant treatment process. Although it is not necessary to apply a vacuum in the surfactant treatment process, the vacuum infiltration tank or any other rotating vessel, chamber or tank can be used. Again, while it is not necessary to apply a vacuum, a vacuum may be applied or the pressure in the vessel may be changed. Further, the surfactant can be added with or without heat or cooling either of the infiltrate, the biochar, the vessel itself, or any combination of the three.

Figure 14:
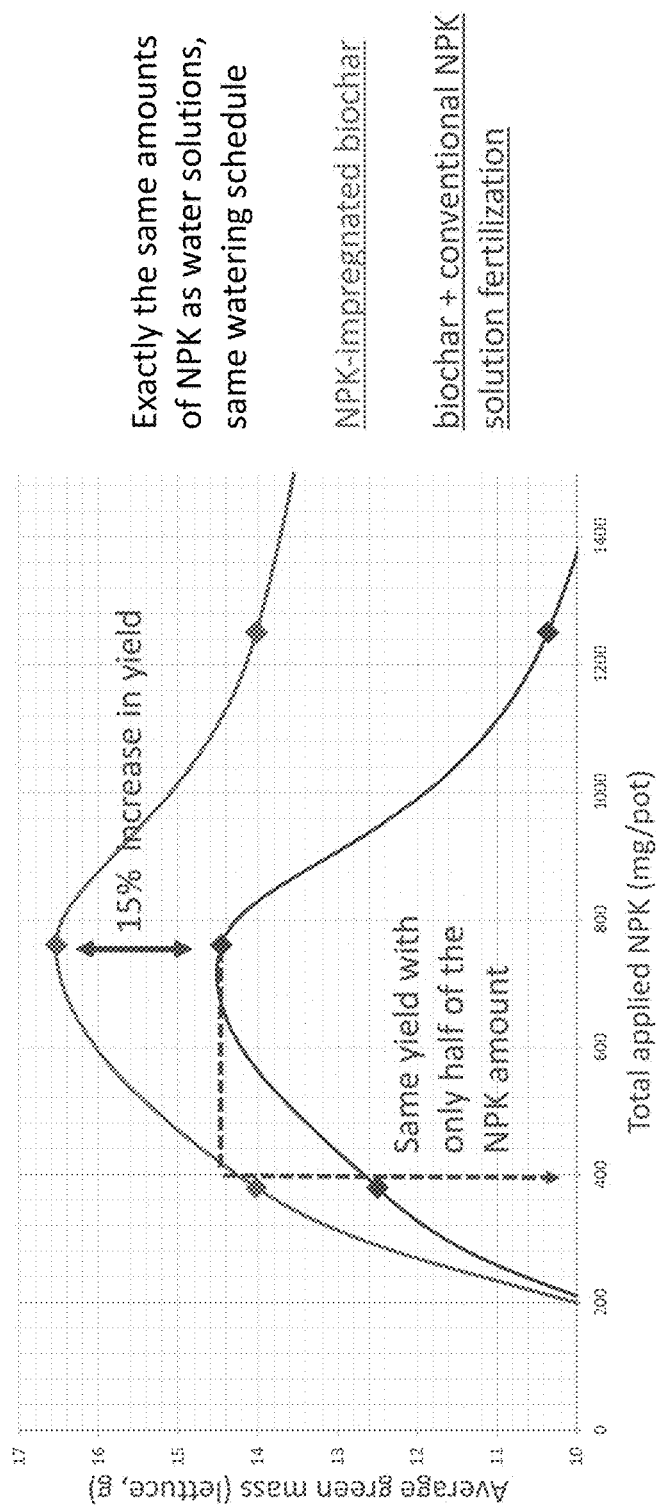
FIG. 14 illustrates the effects of NPK impregnation of biochar on lettuce yield.
Figure 15:
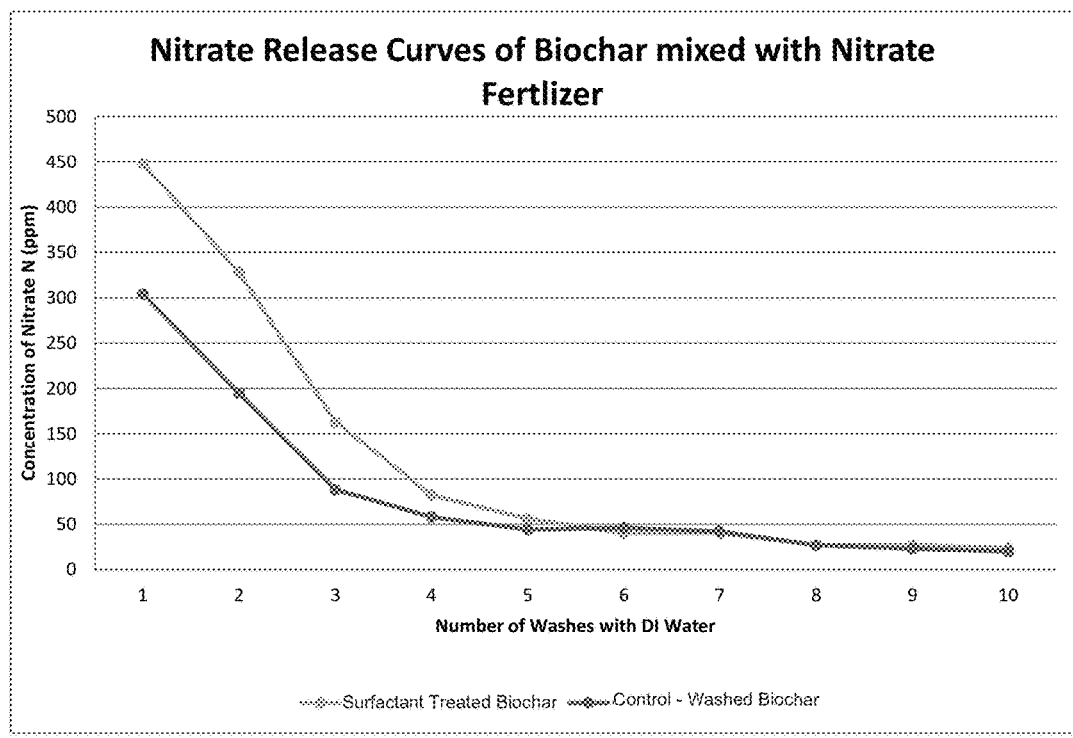
FIG. 15 is a chart showing nitrate release curves of treated biochars infused with nitrate fertilizer.

The utility of infusing the biochar with fertilizer is that the pores in biochar create a protective "medium" for carrying the nutrients to the soil that provides a more constant supply of available nutrients to the soil and plants and continues to act beneficially, potentially sorbing more nutrients or nutrients in solution even after introduction to the soil. By infusing the nutrients in the pores of the biochar, immediate oversaturation of the soil with the nutrients is prevented and a time released effect is provided. This effect is illustrated in connection with FIGS. 14 and 15. As demonstrated in connection with FIGS. 14 & 15 below, biochars having pores infused with additives, using the infusion methods described above, have been shown to increase nutrient retention, increase crop yields and provide a steadier flow of fertilizer to the root zones of the plants. In fact, the interior and exterior surfaces of the biochar may be treated to improve their sorption and exchange capabilities for the targeted nutrients prior to inoculation or infusion. This is the preferred approach as it allows for the tailoring of the surfaces to match the materials being carried. An example would be to treat the surfaces to increase the anionic exchange capacity when infusing with materials which typically manifest as anions, such as nitrates.

D. Application

Given biochar's increased water retention capacities, and structure to support microbial life, the application of the treated biochar and, in some cases raw biochar, can greatly assist with increased efficiency of water and nutrients. To improve soil quality in crop applications, biochar can be applied in a manner that incorporates ease, low cost, effectiveness, and in many cases precision, although in many applications this is not strictly necessary.

To ensure effective application, the biochar to be applied, raw or treated as described previously, should have certain characteristics. At least 95% (by weight) of the biochar applied should have a particle size less than or equal to 10 mm. Also, to demonstrate the best results of biochar addition, the biochar should have one or more of the following properties: an Anion Exchange Capacity ("AEC") greater than 5 meq/l, more preferably greater than 10 meq/l and even more preferably greater than 20 meq/l; a Cation Exchange Capacity ("CEC") greater than 5 meq/l, more preferably greater than 10 meq/l and even more preferably greater than 20 meq/l, an ash content less than 15% (mass basis) and preferably less than 5%; a hydrophobicity index of below 12, more preferably below 10, even more preferably below 6, and most preferably between 0-4 as derived by comparing the sorption of water to ethanol using a tension infiltrometer (Tillman, R. W., D. R. Scotter, M. G. Wallis and B. E. Clothier. 1989, Water-repellency and its measurement by using intrinsic sorptivity. Aust. J. Soil Res. 27: 637-644); and a pH between 4 and 9, preferably between 5 and 8.5, or more preferably between 5 and 6.5.

Anion exchange capacity ("AEC") of biochar may be calculated by directly or indirectly-saturated paste extraction of exchangeable anions, $Cl^-$, $NO_3^-$, $SO_4^{2-}$, and $PO_4^{3-}$ to calculate anion sum or the use of potassium bromide to saturate anions sites at different pHs and repeated washings with calcium chloride and final measurement of bromide (see Rhoades, J. D. 1982, *Soluble salts, p.* 167-179. In: A. L. Page et al. (ed.) Methods of soil analysis: Part 2: Chemical and microbiological properties; and Michael Lawrinenkoa and David A. Laird, 2015, *Anion exchange capacity of biochar*, Green Chem., 2015, 17, 4628-4636). When treated using the above methods, including but not limited by washing under a vacuum, treated biochar generally has an AEC greater than 5 milliq/l and some even have an AEC greater than 20 (millieq/l).

One method for cation exchange capacity ("CEC") determination is the use of ammonium acetate buffered at pH 7.0 (see Schollenberger, C. J. and Dreibelbis, E R. 1930, *Analytical methods in base-exchange investigations on soils*, Soil Science, 30, 161-173). The material is saturated with 1M ammonium acetate, ($NH_4OAc$), followed by the release of the $NH_4^+$ ions and its measurement in meq/100 g (milliequivalents of charge per 100 g of dry soil) or cmolc/kg (centimoles of charge per kilogram of dry soil). Instead of ammonium acetate, another method uses barium chloride according to Mehlich, 1938, *Use of triethanolamine acetate-barium hydroxide buffer for the determination of some base exchange properties and lime requirement of soil*, Soil Sci. Soc. Am. Proc. 29:374-378. 0.1 M $BaCl_2$ is used to saturate the exchange sites followed by replacement with either $MgSO_4$ or $MgCl_2$.

Indirect methods for CEC calculation involves the estimation of extracted $Ca_2^+$, $Mg_2^+$, $K^+$, and $Na^+$ in a standard soil test using Mehlich 3 and accounting for the exchangeable acidity (sum of $H^+$, $Al_3^+$, $Mn_2^+$, and $Fe_2^+$) if the pH is below 6.0 (see Mehlich, A. 1984, *Mehlich-3 soil test extractant: a modification of Mehlich-2 extractant*, Commun. Soil Sci. Plant Anal. 15(12): 1409-1416). When treated using the above methods, including but not limited by washing under a vacuum, treated biochars generally have a CEC greater than 5 millieq/l and some even have a CEC greater than 25 (millieq/l).

To measure hydrophobicity/hydrophilicity, two tests may be used to test the hydrophobicity/hydrophilicity of biochar: (i) the Molarity of Ethanol Drop ("MED") Test; and (ii) the Infiltrometer Test. As set forth above, hydrophobicity index of below 12 is desired, more preferably below 10, even more preferably below 6, and most preferably between 0-4 as indexed by either MED testing or the Infiltrometer Test.

The MED test was originally developed by Doerr in 1998 and later modified by other researchers for various materials. The MED test is a timed penetration test that is noted to work well with biochar soil mixtures. For 100% biochar, penetration time of different mixtures of ethanol/water are noted to work better. Ethanol/Water mixtures verses surface tension dynes were correlated to determine whether treated biochar has increased hydrophilicity over raw biochar. Seven mixtures of ethanol and deionized water were used with a sorption time of 3 seconds on the biochar.

Seven solutions of deionized ("DI") water with the following respective percentages of ethanol: 3, 5, 11, 13, 18, 24 and 36, were made for testing. The test starts with a mixture having no DI. If the solution is soaked into the biochar in 3 seconds for the respective solution, it receives the corresponding Hydrophobicity Index value below.

| Ethanol % | Hydrophobicity Index | |
|---|---|---|
| 0: DI Water | 0 | Very Hydrophillic |
| 3% | 1 | |
| 5% | 2 | |
| 11% | 3 | |
| 13% | 4 | |
| 18% | 5 | |
| 24% | 6 | |
| 36% | 7 | Strongly hydrophobic |

To start the test the biochar ("material/substrate") is placed in convenient open container prepared for testing. Typically, materials to be tested are dried 110° C. overnight and cooled to room temperature. The test starts with a deionized water solution having no ethanol. Multiple drips of the solution are then laid onto the substrate surface from low height. If drops soak in less than 3 seconds, test records substrate as "0". If drops take longer than 3 seconds or don't soak in, go to test solution 1. Then, using test solution 1, multiple drops from dropper are laid onto the surface from low height. If drops soak into the substrate in less than 3 seconds, test records material as "1". If drops take longer than 3 seconds, or don't soak in, go to test solution 2. Then, using test solution 2, multiple drops from dropper laid onto the surface from low height. If drops soak into the substrate in less than 3 seconds, test records material as "2". If drops take longer than 3 seconds, or don't soak in, go to test solution 3. Then, using test solution 3, multiple drops from dropper laid onto the surface from low height. If drops soak into the substrate in less than 3 seconds, test records material as "3". If drops take longer than 3 seconds, or don't soak in, go to solution 4.

The process above is repeated, testing progressively higher numbered MED solutions until the tester finds the solution that soaks into the substrate in 3 seconds or less. The substrate is recorded as having that hydrophobicity index number that correlates to the solution number assigned to it.

Another way to measure hydrophobicity/hydrophilicity is by using a mini disk infiltrometer. For this test procedure, the bubble chamber of the infiltrometer is filled three quarters full with tap water for both water and ethanol sorptivity tests. Deionized or distilled water is not used. Once the upper chamber is full, the infiltrometer is inverted and the water reservoir on the reserve is filled with 80 mL. The infiltrometer is carefully set on the position of the end of the mariotte tube with respect to the porous disk to ensure a zero suction offset while the tube bubbles. If this dimension is changed accidentally, the end of the mariotte tube should be reset to 6 mm from the end of the plastic water reservoir tube. The bottom elastomer is then replaced, making sure the porous disk is firmly in place. If the infiltrometer is held vertically using a stand and clamp, no water should leak out.

The suction rate of 1 cm is set for all samples. If the surface of the sample is not smooth, a thin layer of fine biochar can be applied to the area directly underneath the infiltrometer stainless steel disk. This ensures good contact between the samples and the infiltrometer. Readings are then taken at 1 min intervals for both water and ethanol sorptivity test. To be accurate, 20 mL water or 95% ethanol needs to be infiltrated into the samples. Record time and water/ethanol volumes at the times are recorded.

The data is then processed to determine the results. The data is processed by the input of the volume levels and time to the corresponding volume column. The following equation is used to calculate the hydrophobicity index of R $$I = at + b\sqrt{t}$$

$a$: Infiltration Rate, cm/s $b$: Sorptivity, cm/s$^{1/2}$ $$R = 1.95 * \frac{b_{ethanol}}{b_{water}}$$

As an example, raw biochar and treated biochar were tested with ethanol and water, five times for each. The results below on a coconut based biochar show that the hydrophobicity index of the treated biochar is lower than the raw biochar.

| MATERIAL | HYDROPHOBICITY INDEX |
|---|---|
| Dried Raw Biochar | 12.9 |
| Dried Vacuum Treated Biochar | 10.4 |
| Dried Surfactant Treated Biochar | 7.0 |
| As Is Raw Biochar | 5.8 |
| As Is Vacuum Treated Biochar | 2.9 |

For measuring pH, there are a wide variety of tests, apparatus and equipment for making pH measurements. For example, and preferably when addressing the pH of biochar, batches, particles and pore surfaces of those particles, two appropriates for measuring pH are the Test Method for the US Composting Council ("TMCC") 4.11-A and the pH Test Method promulgated by the International Biochar Initiative. The test method for the TMCC comprises mixing biochar with distilled water in 1:5 [mass:volume] ratio, e.g., 50 grams of biochar is added to 250 mol f pH 7.0±0.02 water and is stirred for 10 minutes; the pH is then the measured pH of the slurry. The pH Test Method promulgated by the International Biochar Initiative comprises 5 grams of biochar is added to 100 mol f water pH=7.0±0.02 and the mixture is tumbled for 90 minutes; 25 the pH is the pH of the slurry at the end of the 90 minutes of tumbling. In one example, prior to and before testing, biochar is passed through a 2 mm sieve before pH is measured. All measurements are taken according to Rajkovich et. al, *Corn growth and nitrogen nutrition after additions of biochars with varying properties to a temperate soil*, Biol. Fertil. Soils (2011), from which the IBI method is based.

To allow for certain application methods to be successful, the biochar should flow well without much dust. This is particularly important in applications focused on row crops. One simple method for determining flow characteristics is by using a series of glass funnels with different outlet diameters. The measurement can either be qualitative, by observing if the material flows through the funnel without interruption, or quantitative by determining the length of time it takes for the material to flow through each funnel and if any manual agitations are necessary during the process. The smaller the outlet diameter funnel that the material flows through without interruption the more flowable the material is considered. For the biochar to flow well, it generally should flow uninterrupted through a funnel with an orifice of 12 mm or less, and preferably through one with an orifice of 8 mm or less.

Another well-known empirical method for predicting flowablity includes looking at both the angle of repose and the Hausner ratio (as explained below). The angle of repose is determined by forming a symmetrical pile or cone of material and then determining the angle of the side of the cone by measuring the height of the cone and the base and calculating said angle, the angle of repose. The Hausner ratio is equal to the tapped bulk density over the loose bulk density of the material. This method is summarized well in Table 1 from "Measuring the flowing properties of powders and grains" by G. Lumay, et. al. in Powder Technology 224 (2012), in which passable flow is classified as having an angle of repose of 41-45° and a Hausner ratio of 1.26 to 1.34, fair flow is classified as having an angle of repose of 36-40° and a Hausner ratio of 1.19 to 1.25, good flow is classified as having an angle of repose of 31-35° and a Hausner ratio of 1.12 to 1.18, and excellent flow is classified as having an angle of repose of 25-30° and a Hausner ratio of 1.00 to 1.11. Materials that have angles of repose of 46° or greater and Hausner ratios of 1.35 or greater are considered poor flowing.

For biochar to flow well, it should generally have an angle of repose of 45° or less and a Hausner ratio of 1.34 or less, and preferably have an angle of repose of 40° or less and a Hausner ratio of 1.25 or less, and even more preferably to have an angle of repose of 35° or less and a Hausner ratio of 1.18 or less. Sometimes the dynamic angle of repose must also be considered to predict flowability of a material. This is defined as the angle of repose while the material is rotating at a specified speed in a drum or a cylinder with a clear flat cover on one end. Biochar should generally have a dynamic angle of repose of 50° or less and preferably 45° or less and even more preferably 40° or less.

A newer method for trying to predict flow characteristics is the compressibility index, which is defined as the difference between the tapped bulk density and the loose bulk density over the tapped density times 100. The general accepted scale of flowability is that a compressibility index of 21 to 25 is passable, 16-20 is fair, 11-15 is good and less than 10 is excellent. A compressibility index of 26 or greater is considered poor. Thus, biochar should generally have a compressibility index of 25 or less, and preferably 20 or less, and even more preferably 15 or less.

Often particulate or powder material can be improved for flowability at the detriment of increased dust creation when applied. Application of a biochar that is dusty can lead to environmental and safety issues particularly in large-scale applications, thus a biochar that is not dusty is preferred in a crop application setting. Higher moisture content is one way to reduce dust formation during application, but if the moisture becomes too high then the material will not flow well. Optimal biochar moisture levels on a weight basis to meet both the dust limitations and flowability requirements are generally between 5 percent and 30 percent, and preferably between 10 percent and 20 percent. It is difficult to achieve and maintain these characteristics without applying some form of treatment to the raw biochar.

One well known factor for improved flowability is uniform particle size and shape. Thus particle size distribution is another biochar characteristic that can impact flowability but it too can impact dust creation at application. Thus, for most agricultural applications, biochar particle size distribution should generally be such that at least 40% or more of the particles (mass basis) are between 0.3 mm and 5.0 mm in diameter, and preferably 50% or more of the particles are between 0.5 mm and 2.0 mm in diameter. To improve biochar flowability further through uniform particle size and shape the biochar particles themselves can be adjusted for example by grinding and/or separating by size. Further uniformation can be done by transforming the biochar particles into agglomerates or pellets, as described in U.S. Provisional Application 62/290,026 titled Biochar Aggregate Particles, filed Feb. 2, 2016, which is incorporated herein by reference in its entirety. The biochar could also be placed into a solution to make a slurry and be applied as a liquid product, as described in co-pending U.S. Provisional Patent Application Ser. No. 62/219,501 filed Sep. 16, 2015 titled Biochar Suspended Solution, which is also incorporated herein by reference in its entirety.

Another option for creating a more flowable product is by mixing in a flow aid to the biochar prior to application. This can either be done in the manufacturing of the biochar product, just prior to application, for example at the farm, or at any time in between, for example at a distributor's facility at time of sale. Flow aids are particularly useful when an optimal biochar moisture level is either unattainable or is not getting the biochar to the desired flowability characteristics. Dry mineral flow aids can be either hydrophobic or hydrophilic. These types of flow aids can be used alone or in combination. Flow aids include but are not limited to perlite, vermiculite, gypsum, lime, diatomaceous earth, sand, talc, silica, zeolite, magnesium stearate, and clays such as bentonite or montmorillonite. In testing the addition of some flow aids or combination of flow aids to a biochar has improved flow rates two or three fold, and in some cases even increased flow ten times over that of the biochar alone.

If the biochar characteristics are compatible with the crop's typical pre-plant fertilizer, it can also be applied by mixing with the fertilizer or other inputs prior to application or co-applying the fertilizer. The fertilizer could be a dry granulated material, a wetter compost material, or even a liquid fertilizer.

Figure 16:
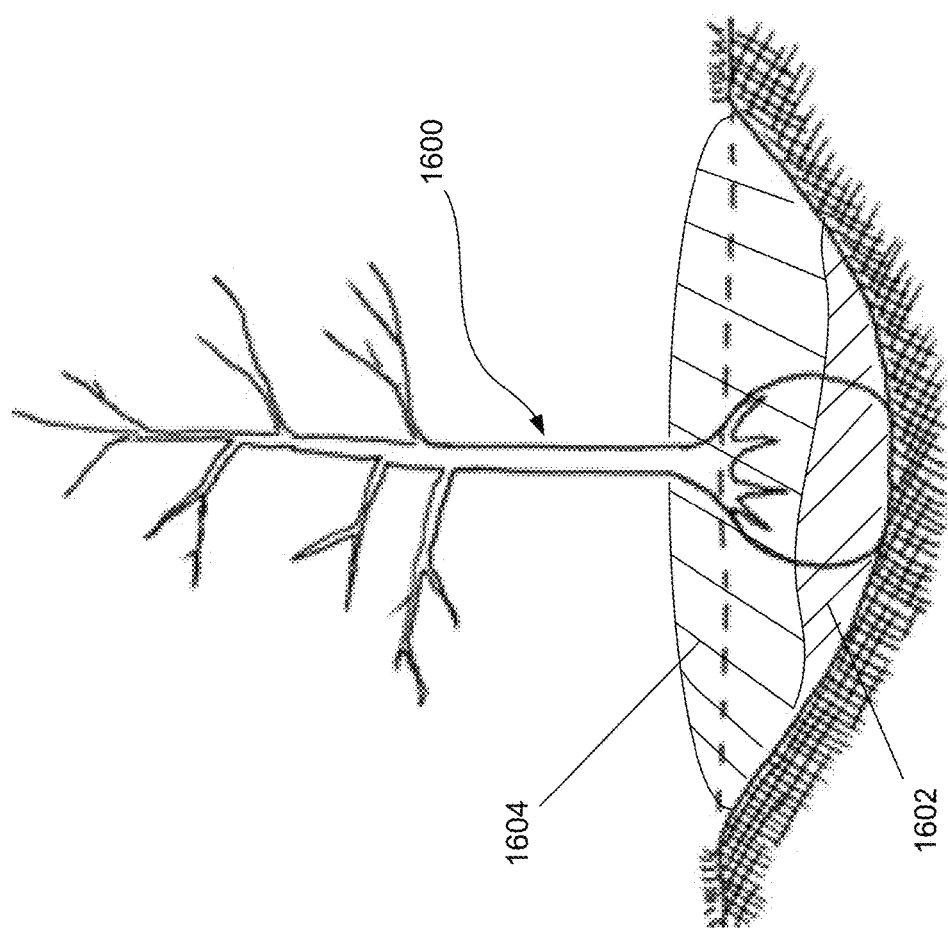
FIG. 16 illustrates the application of biochar in connection with a new tree.

FIG. 16 illustrates one example of an application of biochar in connection with the planting of a new tree 1600. For new tree applications, biochar should be applied to soil in the root zone of the tree at a volumetric rate of 0.1% to 50%. One method to do this is by mixing the biochar with the backfill at the said volumetric rate and applying approximately half the mixture first to the bottom of the hole prepared for planting a new tree, and applying the remaining half of the mixture around the root ball of the newly planted tree during planting. For new tree applications where the trees have a size ranging from 2 to 5 feet or caliper measurements of 5/16" to ½", from 1 cup to 10 gallons of biochar could be used for every new tree planted. Those skilled in the art will recognize that trees having larger sizes may require more biochar, and similarly, trees with smaller sizes may require less biochar. In any event, biochar may be applied at a rate of approximately 1:19—one part biochar to nineteen parts soil or 5%. However, beneficial results may also be seen with application ratios varying between 1:999 to 1:1 or 0.1% to 50%.

In application, the biochar, treated or untreated, is mixed with the soil and applied in the hole dug for the placement of the tree 1600. As noted above, for most applications, biochar is mixed with backfill soil in a ratio of one part biochar to nineteen parts backfill, i.e. a ratio of 1:19, so as to create a percentage of biochar in the soil at the plant root zone equal to about 5%. Depending upon the applications, the desired percentage of biochar could range from approximately 0.1-50%. In the current application, one half of this mixture would then be put on the bottom of the hole 1602, then the new tree placed in the hole 1604, then remaining mixture would be wrapped around the root ball of the tree in order to enable the roots to integrate with the treated biochar as the tree 1600 grows.

Another method for new trees is to apply the biocarbon to the rootball of the transplant tree prior to planting or transplanting. This places the biochar in close vicinity to developing or juvenile root tissue and allows for more ready association of the plant with the material. One way to do this is to wet the rootball of the tree with water or a mixture of water and a binder and then dip it into or coat it with biochar. This can be done on site during the planting or prior to planting for example at the nursery. Another way to incorporate the biochar into the rootball itself is to apply the biochar to the soil substrate at the nursery where the sapling is growing. A third way to incorporate the biochar into the rootball would be to put it inside the wrap, sack, or netting that is placed around the root ball at the nursery. Again, in many instances, treatments can be made to the biochar to allow better affiliation of root tissue with the material—these treatments can include modification of physical or chemical properties as stated earlier, but they can also involve infusion of the biochar with rooting hormones, biologicals, nutritionals, or other materials which promote plant root development.

Yet another application method for new trees is to top dress the soil with a layer of biochar that is between ¼" and 1" after planting the tree and then either incorporating into the top 2-6" or covering with mulch or compost.

Figure 17:
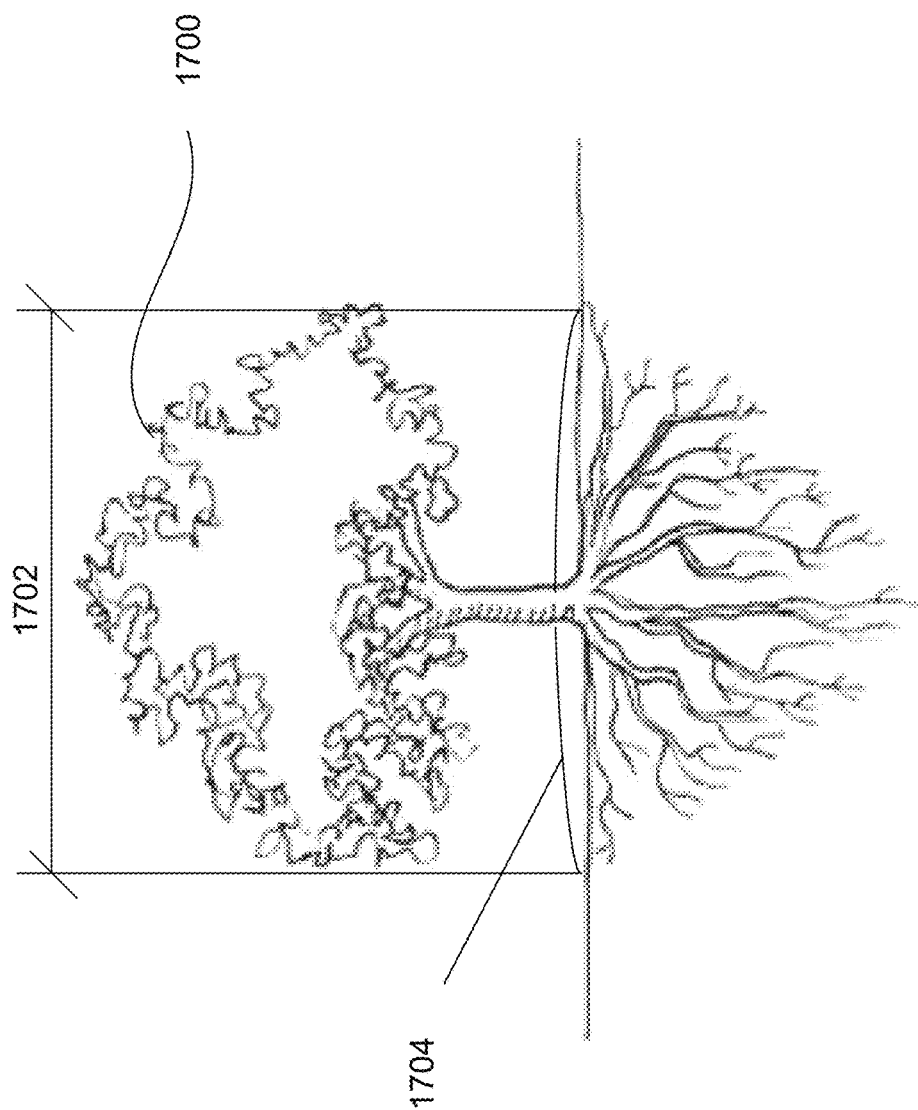
FIG. 17 illustrates the application of biochar to existing trees.

FIG. 17 illustrates one example of an application of treated biochar in connection with established trees 1700. For established tree applications, the target volumetric percentage of biochar in the root zone is between 0.1% and 50% and preferably between 0.3% and 20%, and even more preferably between 0.5% and 10%, so the amount of biochar will vary depending on the size of the tree canopy and the rootball. For established tree applications 1700, one method is to top dress the area around the tree under the canopy 1704 in the drip zone 1702, for example spreading a layer of biochar that is ¼" to 1" deep. The biochar can then be either covered with a mulch or compost or be incorporated into the top 2-3" of soil 1702, for example, by raking the biochar into the soil area in the drip zone 1702. When the tree is more deeply rooted, such as a lemon tree, the biochar may be introduced by means of an auger or air spade device to get the treated biochar closer to the root zone.

Another method for existing trees is to use concentric ring trenching. This means that trenches are dug in a ring set distances from the trunk out to the tree's drip line or a distance away from the trunk equal to 1.5 feet per inch of trunk diameter. The smaller rings, closer to the tree, are dug deeper, and the larger rings closes to the tree's drip line are dug shallower. This is to match the general root system shape, as depicted in FIG. 17, where the roots are generally deepest below the trunk and shallowest by the drip line. The trenches can be made using various techniques including with a shovel, air spade, or drill. The exact number, depth, and length of the ring trenches will be dependent on the tree health and size, again with the preferred (but not required) objective being to deliver the proper percentage of material into the vicinity of developing or growing root tissue. After the trenches are made the biochar is integrated by mixing it with the backfill in a ratio from 0.1% to 50% based on volume. Generally speaking, with this method the percentage in the backfill will be a bit higher than with planting a new tree since a smaller portion of the root zone soil is being treated with the biochar. So a typical ratio may be about 1:4 or 20%.

A similar method for existing trees is to use radial trenching, where a number of trenches are created from the trunk to the dripline or to a distance from the trunk equal to 1.5 feet per inch of trunk diameter. The trenches are dug deeper near the trunk and become shallower as they get closer to the tree's drip line. Again, this is to match the general root system shape, as depicted in FIG. 17, where the roots are generally deepest below the trunk and shallowest by the drip line. The trenches can be made using various techniques including with a shovel, air spade, or drill. The exact number, depth, and length of the radial trenches will be dependent on the tree health and size. After the trenches are made the biochar is integrated by mixing it with the backfill in a ratio from 0.1% to 50% based on volume. Generally speaking with this method the percentage in the backfill will be a bit higher than with planting a new tree since a smaller portion of the root zone soil is being treated with the biochar. So, a typical ratio may be about 1:4.

Yet another method for existing trees is to use vertical mulching. Vertical mulching is a common procedure for trees used to aerate soil, partially decompact soil, fertilize the soil, or inoculate the root zone, so it lends itself well to biochar application. Vertical mulching involves the drilling of holes at regular spacing in the soil throughout the critical root zone beneath the tree canopy again usually to the drip line or to a distance from the trunk equal to 1.5 feet per inch of trunk diameter. Holes are often drilled with a 2-3 inch wide auger bit to a depth of 8-10 inches on "2½ foot centers," which means the holes are spaced apart 2½ feet on a grid pattern or a concentric circular pattern. Again, the exact number, depth, and size of the holes will be dependent on the tree health and size. After the holes are made, the biochar is integrated by mixing it with the backfill in a ratio from 0.1% to 50% based on volume. Generally speaking with this method the percentage in the backfill will be a bit higher than with planting a new tree since a smaller portion of the root zone soil is being treated with the biochar. So, a typical ratio may be about 1:3 for vertical mulching.

It should be noted that surface application, concentric ring trenching, radial trenching, and vertical mulching can all be combined in any combination to provide the most effective delivery of material to the root zone of existing plants, trees, crops, or ornamental shrubs. One, two, or all of the methods above may be used independently, or in conjunction, in any order, and either be performed simultaneously, or separated in time by days, weeks, months, or even years.

Figure 18B:
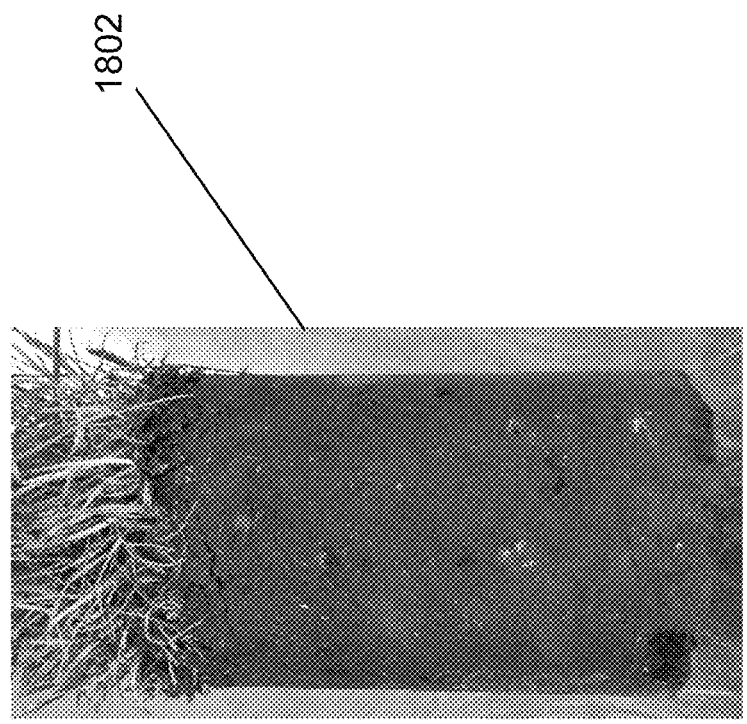
FIG. 18b illustrates a control soil core sample taken nineteen weeks after sod installation where no biochar was applied prior to applying the turf to the soil.
Figure 18A:
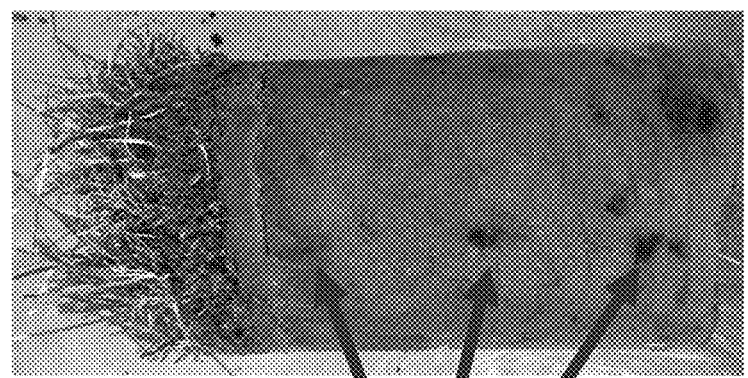
FIG. 18a illustrates a soil core sample taken nineteen weeks after sod installation where biochar was applied on top of the soil surface before sod installation.

One of the reasons biochar application in agricultural crops can be more focused or not uniformly applied throughout the entire soil is that the roots can associate with the biocarbon particles and then bring the biocarbon particles with them as they grow. Thus, the biocarbon particles actually migrate through the soil. This is particularly true with treated biochar as its increased hydrophilicity, neutral pH, and inoculation with water or other substances can often increase the association of root development near said treated biochar. FIGS. 18a and 18b illustrates this biochar migration due to root development and root association with treated biochar. In particular, FIGS. 18a and 18b illustrate soil cores taken 19-weeks after sod installation. In the soil core sample illustrated in FIG. 18a, biochar was applied on top of the soil surface without rototilling and before sod installation. FIG. 18b illustrates a control soil core sample control where no biochar was applied before applying the turf to the soil. As illustrated in FIG. 18a, the biochar particles 1802 can be seen greater than 6 inches below the soil surface, demonstrating the migration of the biochar into the soil due to root development.

The ability to apply biochar at lower rates and more focused applications allows for a more economical model for the grower. This benefit is most profound and needed in row crops, where growers look for the lowest cubic yard per acre usage to get the benefits they need to ensure the best value per acre of crop they produce.

Figure 19:
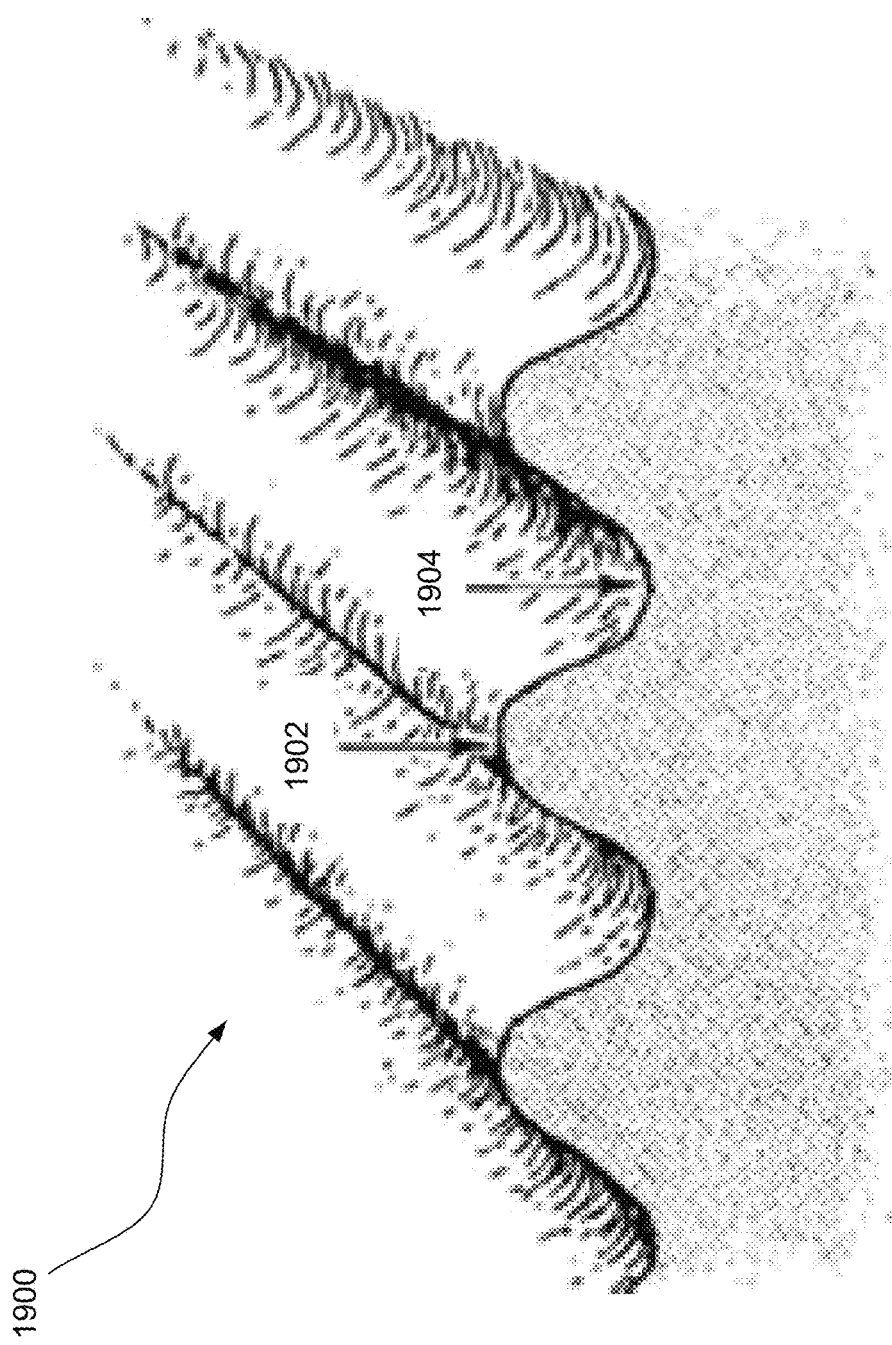
FIG. 19 illustrates the application of biochar to row crops and vines.

FIG. 19 illustrates one example of an application of treated biochar in connection with row crops 1900. Row crops are general comprised of ridges 1902 and furrows 1904, with the plant beds being on the ridges 1902. For row crop applications, the furrows can often make up a significant percentage of the land area, in some cases up to ½ the land acres. Thus, treating just the beds or even just the plant rows in the bed are the most effective ways to capture the benefits of a treatment at the lowest usage and thus, lowest cost. As with other crops, a target volumetric percentage of biochar, treated or untreated, in the root zone of the plants can be 0.1% to 50%, and preferably 0.3% to 20%. Depending on dimensions of the row crops, treatment of the biochar to enhance beneficial or desirable properties, and the specific method of application, this could equate to 0.1 to 100 cubic yards per acre.

For row crops 1900, the easiest method for applying the treated biochar at high rates is to spread it either across the entire area before bedding or across all the beds 1902 after bedding and then incorporating it into the top 2-6" prior to planting. The initial application can be done using various methods including but not limited to broadcast, orchard, drop, compost, or manure spreaders. If laying down of product happens after the beds are made, then the incorporation can be done using various methods including but not limited to using a rototiller, cultivator, disk, or shank.

Another more focused method that can be used is by laying down the biochar along the planned plant rows in a bed, which depending on the crop is generally 1 to 5 plant rows per bed. This is accomplished by using equipment that lays down one or multiple bands of material. The band of biochar that is placed where the plant row will be can be anywhere from 2 to 18 inches wide. Again prior to planting, the biochar can be laid either prior to bed formation so that the bed formation incorporates the material into the soil or after the bed is formed and then followed by an incorporation method that mixes the biochar into the top 2 to 6 inches of soil. Equipment that can be used for laying down these bands include but are not limited to gandy, insecticide, seed, and fertilizer boxes. With this method, low overall application rates of 1 to 10 cubic yards per acre are easily achievable.

A final even further focused method that can be used is by putting down the biochar just where the seeds or transplants will be planted and incorporated into the top 2-6 inches of soil. This method generally requires applying the biochar at the time of planting but allows for the lowest overall application rates down to 0.1 or even 0.01 cubic yards per acre, while still meeting the volumetric percentage goal in the root zone (or germination zone, in the case of a seed) of the plant. This method can be done by hand or by equipment that includes but is not limited to seed drills, planters, or strip till devices.

For enhancing a soil environment having plant beds with porous carbonaceous particles for the purpose of cultivating plants, the porous carbonaceous particles may be incorporated into the top 1-6" inches of the soil of the plant beds and the porous carbonaceous particles may be incorporated into the soil of the plant beds at a rate of between 0.5 to 10 cubic yards per acre.

When planting row vines, it may be desirable for the biochar to be incorporated deeper, such as into the top 4-12" of the plant bed, or alternatively mixing them in with backfill of individual vine holes in a similar way as to new trees as described previously and depicted in FIG. 16.

When the vines are established, the biochar may applied as a side dressing, using equipment such as a manure or compost spreader and then disking or shanking the material into the soil to incorporate it 4-12" deep on the side of the plant beds.

For containerized and potted plants, the biochar may be first mixed with soil, in the desired volumetric percentage ranging from 0.1% to 50%. The mixture may be localized around the root zone of the potted plants during transplant. Alternatively, the biochar may be placed at the bottom of the container and soil placed directly on top without blending. Similarly, this method may also be used in connection with outdoor flower and vegetable gardens. When used for outdoor flower and vegetable gardens, the mixture may be applied to the top 1"-6" of soil in the garden, but preferably between 2"-4".

In hydroponic applications, the biochar may be mixed with a well-known growth medium or substrate, such as rock wool, or used alone. Typically in hydroponic applications, larger particle sizes are desirable, with at least of 50% of particles (mass basis) being greater than 2.0 mm in diameter, although this is not strictly necessary.

In tests conducted with different agricultural crops (e.g. cucumbers, lettuce and tomatoes), biochar has been shown to promote improvements in crop vigor, quality and productivity and immobilize toxins in reduced water and fertilizer environments.

For example, in a sample of approximately seventy lettuce plants grown in an environment of reduced fertigation rates of 25 lbs/acre, those lettuce plants that were grown with 6 cubic yards per acre of treated biochar, treated in accordance with the methods set forth above, demonstrated an increase in wet biomass grown over the same time period than the control plants grown in the same soil, with the same fertigation rates, absent the biochar. Increase in wet biomass (e.g., plant weight after harvest) showed a generally consistent increase over a control group of the same number plant. Summary results of this study and harvest yield are shown below.

| Groups | Count | Sum | Average | Variance |
| --- | --- | --- | --- | --- |
| 6 CY/acre | 67 | 172.8 | 2.579104 | 0.558951 |
| Control | 67 | 141.6 | 2.113433 | 0.454817 |

The above reports the sum of the wet biomass of sixty-seven lettuce plants in a control and sixty-seven lettuce plants in soil having treated biochar applied at a rate of 6 cubic yards per acre. The average wet biomass per plant and variance is reported above. The same reduction in fertilizer was applied, in the same soil, using the same water conditions, for both the control group and biochar enhanced group.

Similar testing was performed on tomato crops applied to the same soil, under the same watering condition. For these tests, perlite, vermiculite and treated biochar (treated in accordance with the above described treatment methods) were each applied to separate crops. The data demonstrated that soil with the treated biochar maintained a neutral soil pH of 7 as compared to perlite and vermiculite. The soil with the treated biochar was also shown to increase water retention rates and available potassium (ppm), as well as immobilize toxic substances. These results are summarized below.

|  | Perlite | Vermiculite | Treated Biochar (pine) |
|---|---|---|---|
| Size | 2-2.8 mm | 2-2.8 mm | 2-2.8 mm |
| pH | 6 | 8.5 | 7 |
| Water retention, % | 25 | 220 | 308 |
| Avail. Potassium, ppm | 0 | 2.2 | 1575 |
| Immobilize Toxics | NO | NO | YES |

Further trials were performed to evaluate the effects of grower standard fertilizer and watering programs against a 20% reduced grower standard fertilizer and watering program for the production of cannery tomatoes with and without a known rate of treated biochar incorporated into the planting beds. The grower standard fertilizer at 100% and at an 80% reduction for fertilizer application rates (gallons per acre) upon which the trials were based is shown below.

| Fertilizer Application rate gallons per acre | | |
|---|---|---|
|  | Growers Standard | 80% N |
| 2-16-16 (P, K) | 2 | 2 |
| UN 32 (N) | 17 | 13.5 |
| KTS (K, S) | 10 | 10 |

The treated biochar in the test application was incorporated into the planting beds at 30% of the bed volume (1.67 feet wide by ½ foot deep) by placing the appropriate amount of material on the beds and incorporating with a rototiller. In season fertilizer was applied at standard and reduced rates by the growers in field drip tape as indicated below. The final plant production data for the variations in application standards for water and fertilizer with and without the treated biochar is shown below.

| Final Production Data, pounds in each Replicate | | | | | |
|---|---|---|---|---|---|
| Replicate | Growers Standard | Treated Biochar- 20% N | Growers Standard - 20% N | Treated Biochar- 20% H2O | Growers Standard - 20% H2O |
| 1 | 56.0 | 89.6 | 28.8 | 38.4 | 36 |
| 2 | 52.8 | 73.6 | 47.2 | 49.6 | 33.6 |
| 3 | 41.6 | 60.8 | 35.2 | 54.4 | 40 |
| 4 | 46.4 | 54.4 | 56.0 | 78.4 | 44.8 |
| 5 | 40.8 | 67.2 | 33.6 | 65.6 | 38.4 |
| 6 | 38.4 | 41.6 | 38.4 | 64.8 | 51.2 |
| Total Pounds | 276 | 387.2 | 239.2 | 351.2 | 244 |
| % Improvement | 0% | 40% | -13% | 27% | -12% |

As illustrated above, the incorporation of the treated biochar with a 20 percentage reduction in fertilizer and water, reduced and tested independently, produces higher product yields than the grower's standards. The test further demonstrates that the introduction of the treated biochar is the catalyst for the increased yield with at least 20 percentage reduction in fertilizer over grower standards and with at least 20 percent reduction in water over grower's standards.

In another field trial, the more focused lower overall application rates were tested on a lettuce crop. The trial used six 250-sq ft replicates per treatment and compared the use of two different feedstock based treated biochars at two different rates versus grower standard. The application method used was the band method on top of the bed along the plant row prior to planting. The material was laid down in a 6 inch band using a Gandy box applicator and then incorporated several inches evenly into the soil using a rotary tiller. The two application rates used were 0.5 cubic yards per acre and 1.6 cubic yards per acre, and with said method were estimated to be at about 1 percent (volume) and 3 percent (volume), respectively, in the root zone. At the mature leaf lettuce harvest, eighty plants were randomly selected to be harvested from each treatment block. The final plant weight harvests are shown below, and all yield improvement results were statistically significant at a 90% confidence interval:

|  | Growers Standard | Treated Biochar from Coconut Shell | Treated Biochar from Pine Wood | Treated Biochar from Coconut Shell | Treated Biochar from Pine Wood |
|---|---|---|---|---|---|
| Biochar Rate (Cubic yards/acre) | 0 | 0.5 | 0.5 | 1.6 | 1.6 |
| Estimated Biochar vol % in root zone | 0% | 1% | 1% | 3% | 3% |
| Yield (lbs) | 65.83 | 95.67 | 87.17 | 104.17 | 84.67 |
| Yield increase over growers standard | — | 45.3% | 32.4% | 58.2% | 28.6% |

For purposes of this application, "grower's standard" shall mean good agricultural practice as it relates to a particular crop, geographic region, climate and soil condition. Grower's standards will govern watering patterns, watering amounts, fertilizer types and fertigation rates.

As illustrated, biochar increases the water and nutrient holding and retention capacity of the soils where it is applied. These components are held in the root zone for easy access by plant roots, which lead to high growth performance. Tree plantings demonstrate substantial decreases in the rate of tree mortality and the ability to sustain tree health during variations in seasonal rainfall.

In summary, regardless of the method of application, biochar incorporated into or around the root zone of a plant at ratios of between 1:999 to 1:1 biochar to soil, i.e. a volumetric percentage of 0.1% to 50%, increases the water and nutrient holding and retention capacity of the soil where it is applied. However, application does not necessarily need to be restricted or limited to these ratios. Biochar can be added to soil at a concentration of 0.01% up to 99% depending upon the application, plant type and plant size. As most crop plants extract greater than 90% of their water from the first twenty-four inches below the soil surface, the above applications will generally be effective incorporating the biochar around the root zone from the top surface of the soil to a depth of 24" below the top surface of the soil, or alternatively, within a 24" radius surrounding the roots regardless of root depth or proximity from the top surface of the soil. When the plant roots are closer to the surface, the incorporation of the biochar within the top 2-6" inches of the soil surface may also be effective. Greater depths are more beneficial for plants having larger root zones, such as trees.

Similarly to the root zones, biochar may also be applied within a 24" radius around the distribution of water that is delivered from both low flow and high flow irrigation systems. For the purpose of this application, "low flow system" includes, but is not limited to, micro sprays, drip emitters, and drip lines and "high flow systems" includes but is not limited to fixed sprays, rotors, bubblers, and soaker hoses. For example, for drip lines, because the placement of water is applied and distributed at or near the drip line, biochar may be applied in the area surrounding the drip irrigation pipes at similar depth, concentrations and quantities, such that application in the area around the drip irrigation pipes is similar to the application around the plant root zones. For fixed sprays, biochar may be applied within a 24" radius relative to the distance to which the water is sprayed and distributed instead of at or near the fixed spray irrigation head. Surface and subsurface irrigation systems may also vary the application of biochar. The application does not, however, need to be restricted or limited to the application specifications for plant root zones. Because the rate of water movement, water distribution, water discharge, water volume, and water placement vary depending on the irrigation system operated, different depths, concentrations and quantities of biochar may be applied to correspond to the particular irrigation system to which it is being applied. In addition, if the biochar has been created into a slurry, powder suspended in liquid, as described previously, it can also be applied directly through the irrigation tape or pipes.

Although the utilization of the chemical and physical properties of biochar for optimal plant growth would ideally be most effective when applied to plants during or prior to their peak growing cycle and at maintenance periods, all of the applications discussed above can be applied at any time during the different stages of plant growth or ground preparation as needed. Similarly, the methods of application can be repeated as many times as needed from year to year depending on factors not limited to plant type, climate, soil properties, topography, and light.

A method for applying porous carbonaceous particles to soil for purpose of cultivating plants, where at least 95% of the porous carbonaceous particles have a particle size less than or equal to 10 mm, the method comprising: incorporating the porous carbonaceous particles to the soil surrounding the plant at a depth between 0-24 inches from the soil surface, where the porous carbonaceous particles are positioned in the area surrounding the roots of the plants in a ratio of between 1:999 to 1:1 porous carbonaceous particles to soil.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A method for applying treated porous carbonaceous particles to soil for the purpose of cultivating plant growth of plants having roots, where at least 95% of the treated porous carbonaceous particles have a particle size less than or equal to 10 mm and have been treated by infusing a liquid into the pores of the porous carbonaceous particles, the method comprising: incorporating the treated porous carbonaceous particles into the soil surrounding the root zone of the plants roots, where the treated porous carbonaceous particles are positioned in the area surrounding the roots of the plants where the volumetric percentage of the treated porous carbonaceous particles in the soil surrounding the root zone is between 0.1% to 10%.

2. The method of claim 1 where the incorporation of the treated porous carbonaceous particles to the soil surrounding the plant roots further includes the steps of:
creating voids in the area of soil where the plants are to be planted;
mixing the treated porous carbonaceous particles with backfill soil at a ratio of between 1:999 to 1:9 treated porous carbonaceous particles to soil;
filling the voids with a backfill soil mixture to cover the bottom of each of the voids;
placing plants in the voids; and
filling any open area in the void surrounding the roots of the plants with the backfill soil mixture.

3. The method of claim 2 where the plant is a tree and the treated porous carbonaceous particles are mixed with the backfill soil at a rate of approximately five percent treated porous carbonaceous-particles in the backfill soil.

4. The method of claim 2 where the plant is a vine.

5. The method of claim 2 where the plant is a flowering plant, the voids are created in containers and the treated porous carbonaceous particles are mixed with the backfill soil.

6. The method of claim 2 where the plant is a vegetable producing plant, the voids are created in containers and the treated porous carbonaceous particles are mixed with the backfill soil.

7. The method of claim 1 where the treated porous carbonaceous particles are derived from wood.

8. The method of claim 1 where the treated porous carbonaceous particles are derived from coconut shells.

9. The method of claim 1 where the treated porous carbonaceous particles are treated by infusing the liquid into the macropores of the plurality of porous carbonaceous particles using a vacuum.

10. The method of claim 1 where the treated porous carbonaceous particles are treated by infusing the liquid into the macropores of the plurality of porous carbonaceous particles using a surfactant.

11. A method for enhancing a soil environment with treated porous carbonaceous particles for the purpose of cultivating plant growth, the method comprising the steps of:
creating a void for the acceptance of a plant having roots or plant seed;
mixing the treated porous carbonaceous particles into the soil at a ratio of between 1:999 to 1:9 treated porous carbonaceous particles to soil, where at least 95% of the treated porous carbonaceous particles have a particle size less than or equal to 10 mm and have been treated by infusing the porous carbonaceous particles with a liquid; and
adding the soil mixture to the void.

12. The method of claim 11 where the void is filled with the soil mixture such that the soil mixture covers the bottom of the void, where the plant having roots or plant seed is placed in the void on top of the soil mixture and where any open area in the void surrounding the roots or seed of the plant placed in the void is then filled with the soil mixture.

13. The method of claim 12 where the plant having roots or plant seed is a tree and the treated porous carbonaceous particles are mixed with backfill soil in the ratio of approximately one part treated porous carbonaceous particles to nineteen parts backfill soil to create the soil mixture.

14. The method of claim 12 where the plant having roots or plant seed is a vine and the treated porous carbonaceous particles are mixed with backfill soil.

15. The method of claim 12 where the plant having roots or plant seed is a flowering plant, the voids are created in containers and the soil mixture is placed in the containers.

16. The method of claim 12 where the plant having roots or plant seed is a vegetable producing plant, the voids are created in containers and the soil mixture is placed in the containers.

17. The method of claim 11 where the treated porous carbonaceous particles are derived from wood.

18. The method of claim 11 where the treated porous carbonaceous particles are derived from coconut shells.

19. The method of claim 11 where the treated porous carbonaceous particles are treated by infusing the liquid into the macropores of the plurality of porous carbonaceous particles using a vacuum.

20. The method of claim 11 where the treated porous carbonaceous particles are treated by infusing the liquid into the macropores of the plurality of porous carbonaceous particles using a surfactant.

21. A method for enhancing a soil environment having plant beds with treated porous carbonaceous particles for the purpose of cultivating plants for plant growth, the method comprising: incorporating the treated porous carbonaceous particles into the top 1-6" inches of the soil of the plant beds, where at least 95% of the treated porous carbonaceous particles have a particle size less than or equal to 10 mm and have been treated by infusing the porous carbonaceous particles with a liquid, and where the treated porous carbonaceous particles are incorporated into the soil of the plant beds at a rate of between 0.5 to 10 cubic yards per acre.

22. The method of claim 21 where the treated porous carbonaceous particles are incorporated into the top 2-3" inches of the plant beds.

23. The method of claim 21 where the treated porous carbonaceous particles are incorporated into the top 4-6" inches of the plant beds.

24. The method of claim 21 where the treated porous carbonaceous particles are incorporated by spreading the treated porous carbonaceous particles over the surface of the soil and then tilling the soil or bedding the soil up.

25. The method of claim 21 where the treated porous carbonaceous particles are incorporated by spreading the porous carbonaceous particles over the surface of the soil of the plant beds and then incorporating the treated porous carbonaceous particles into the soil by tilling or cultivating.

26. The method of claim 21 where the treated porous carbonaceous particles are incorporated into the soil of the plant beds at a rate of between 0.5 to 5 cubic yards per acre.

27. The method of claim 21 where the treated porous carbonaceous particles are incorporated into the soil of the plant beds by side dressing the plant beds with a spreader and a disk.

28. The method of claim 21 where the treated porous carbonaceous particles are incorporated into the top 4-6" of the soil on the side of the plant bed.

29. The method of claim 21 where the treated porous carbonaceous particles are derived from wood.

30. The method of claim 21 where the treated porous carbonaceous particles are derived from coconut shells.

31. The method of claim 21 where the treated porous carbonaceous particles are treated by infusing the liquid into the macropores of the plurality of porous carbonaceous particles using a vacuum.

32. The method of claim 21 where the treated porous carbonaceous particles are treatment for infusing a liquid into the macropores of the plurality of porous carbonaceous particles using a surfactant.

33. A method for applying treated porous carbonaceous particles to soil surrounding a tree for the purpose of cultivating tree growth, the method comprising: incorporating the treated porous carbonaceous particles into the top 1-6" inches of the soil under the canopy of the tree in the drip zone of the tree, where at least 95% of the treated porous carbonaceous particles have a particle size less than or equal to 10 mm and have been treated by infusing the porous carbonaceous particles with a liquid and where the volumetric percentage of the treated porous carbonaceous particulars in the soil is between 0.1% to 10%.

34. The method of claim 33 where the step of incorporating the treated porous carbonaceous particles further comprising: top dressing the area around the tree defined by the tree canopy, spreading a ¼" to 1" layer of the treated porous carbonaceous particles across such area around the tree and either raking the treated porous carbonaceous particles into the top 1-4" of soil in such area or covering with mulch or compost.

35. The method of claim 33 where the treated porous carbonaceous particles are incorporated into the top 2-3" of soil.

36. The method of claim 33 where the treated porous carbonaceous particles are incorporated into the soil by use of an auger or an air spade.

37. The method of claim 33 where the treated porous carbonaceous particles are incorporated into the soil by use of a rake or tiller.

38. The method of claim 33 where the treated porous carbonaceous particles are derived from wood.

39. The method of claim 33 where the treated porous carbonaceous particles are derived from coconut shells.

40. The method of claim 33 where the treated porous carbonaceous particles are treated by infusing the liquid into the macropores of the plurality of porous carbonaceous particles using a vacuum.

41. The method of claim 33 where the treated porous carbonaceous particles are treated by infusing a liquid into the macropores of the plurality of porous carbonaceous particles using a surfactant.

42. A method for applying treated porous carbonaceous particles to soil for the purpose of cultivating plants growth of plants having roots, where the porous carbonaceous particles have been treated by infusing the porous carbonaceous particles with a liquid, the method comprising the step of incorporating the treated porous carbonaceous particles into the soil surrounding the plant roots at a depth of between 0-24 inches from the soil surface, where the volumetric percentage of the treated porous carbonaceous particulars in the soil surrounding the root zone is between 0.1% to 10%.

43. The method of claim 42 where the treated porous carbonaceous particles have one or more of the following properties: (i) an Anion Exchange Capacity ("AEC") greater than 5 meq/l; (ii) a Cation Exchange Capacity ("CEC") greater than 5 meq/l; (iii) an ash content less than 15% (mass basis); (iv) a hydrophobicity index of below 12; or (v) a pH between 4 and 9.

44. The method of claim 42 where the treated porous carbonaceous particles are applied by laying down multiple bands of the treated porous carbonaceous material on the soil surface.

45. The method of claim 42 where the treated porous carbonaceous particles have a dynamic repose of 45 degrees or less.

46. The method of claim 42 where the treated porous carbonaceous particles have a compressibility index of 25 or less.

47. The method of claim 42 where the treated porous carbonaceous particles have a moisture level on a weight basis of between 5 to 30 percent.

48. The method of claim 42 where the treated porous carbonaceous particles have a particle size distribution such that at least 40% or more of the particles (mass basis) are between 0.3 mm and 5.0 in diameter.

49. The method of claim 42 where the treated porous carbonaceous particles have a Hausner ratio of 1.34 or less.

* * * * *